(12) United States Patent
Spain et al.

(10) Patent No.: US 6,984,280 B2
(45) Date of Patent: *Jan. 10, 2006

(54) DRY PAINT TRANSFER PROCESS FOR MAKING DEEP-DRAW HIGH DOI AUTOMOTIVE BODY PANELS

(75) Inventors: Patrick L. Spain, Parker Canyon, AZ (US); Keith L. Truog, Crown Point, IN (US); Frank Rohrbacher, Jr., Wilmington, DE (US)

(73) Assignee: Avery Dennison Coporation, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/434,421

(22) Filed: May 8, 2003

(65) Prior Publication Data

US 2004/0123942 A1    Jul. 1, 2004

Related U.S. Application Data

(60) Continuation of application No. 10/273,420, filed on Oct. 17, 2002, now abandoned, which is a continuation of application No. 08/402,956, filed on Mar. 13, 1995, now Pat. No. 6,579,397, which is a division of application No. 08/346,548, filed on Nov. 29, 1994, now Pat. No. 6,835,267, which is a continuation of application No. 08/179,765, filed on Jan. 10, 1994, now abandoned, which is a continuation of application No. 08/025,827, filed on Mar. 3, 1993, now abandoned, which is a continuation of application No. 07/873,708, filed on Apr. 22, 1992, now abandoned, which is a continuation of application No. 07/424,302, filed on Nov. 22, 1989, now abandoned, which is a continuation-in-part of application No. 07/162,917, filed on Mar. 2, 1988, now abandoned, which is a continuation-in-part of application No. 07/031,984, filed on Mar. 27, 1987, now abandoned.

(51) Int. Cl.
| | |
|---|---|
| B44C 1/165 | (2006.01) |
| B29B 11/08 | (2006.01) |
| B32B 31/20 | (2006.01) |
| B29D 9/00 | (2006.01) |

(52) U.S. Cl. .................. 156/230; 156/231; 156/238; 156/240; 156/245; 264/510; 264/516; 428/200

(58) Field of Classification Search ........ 156/230–233, 156/238–240, 241, 247, 277, 273.3, 289, 156/196, 245, 246, 540, 280; 264/209, 509–511, 264/516; 428/195.1, 200–204, 207, 343, 428/347, 914, 40, 41, 40.1, 41.1; 427/146–148
See application file for complete search history.

(56) References Cited

U.S. PATENT DOCUMENTS

| | | | |
|---|---|---|---|
| 2,159,693 | A | 5/1939 | Gaylord |
| 2,977,639 | A | 4/1961 | Barkhuff, Jr. et al. |
| 3,057,018 | A | 10/1962 | Lawrence et al. |
| 3,253,060 | A | 5/1966 | Koblitz et al. |
| 3,458,391 | A | 7/1969 | Miller, Jr. |
| 3,459,834 | A | 8/1969 | Schmitt |
| 3,493,257 | A | 2/1970 | Fitzgerald et al. |
| 3,524,906 | A | 8/1970 | Schmitt et al. |
| 3,579,485 | A | 5/1971 | Folzenlogen et al. |
| 3,626,026 | A * | 12/1971 | Fukumura et al. .......... 525/166 |
| 3,654,062 | A | 4/1972 | Loew |
| 3,679,506 | A | 7/1972 | Burgess et al. |
| 3,679,510 | A | 7/1972 | Conley et al. |
| 3,844,993 | A | 10/1974 | Miller |
| 3,880,690 | A | 4/1975 | Fuchs et al. |
| 3,908,070 | A | 9/1975 | Marzolf |
| 3,949,139 | A | 4/1976 | Dunning et al. |
| 4,101,698 | A | 7/1978 | Dunning et al. |
| 4,201,612 | A | 5/1980 | Figge et al. |
| 4,208,465 | A | 6/1980 | Chang |
| 4,235,949 | A | 11/1980 | Van Manen et al. |
| 4,248,762 | A | 2/1981 | Hornibrook et al. |
| 4,263,077 | A | 4/1981 | Rampelberg |
| 4,275,099 | A | 6/1981 | Dani |
| 4,303,697 | A | 12/1981 | Baseden |
| 4,307,058 | A | 12/1981 | Morello et al. |
| 4,314,004 | A | 2/1982 | Stoneberg |
| 4,317,860 | A | 3/1982 | Strassel |
| 4,349,592 | A | 9/1982 | Nussbaum |

| | | | | | | |
|---|---|---|---|---|---|---|
| 4,349,643 A | 9/1982 | Mohiuddin | | JP | 55-060511 | 5/1980 |
| 4,359,504 A | 11/1982 | Troy | | JP | 56-127435 | 10/1981 |
| 4,364,886 A | 12/1982 | Strassel | | JP | 56-140064 | 3/1982 |
| 4,369,157 A | 1/1983 | Conner | | JP | 57-039940 | 3/1982 |
| 4,396,672 A | 8/1983 | Adesko | | JP | 58-203048 | 11/1983 |
| 4,396,680 A | 8/1983 | Chang | | JP | 59-120432 | 7/1984 |
| 4,403,003 A | 9/1983 | Backhouse | | JP | 59-135231 | 8/1984 |
| 4,403,004 A | 9/1983 | Parker et al. | | JP | 59-227447 | 12/1984 |
| 4,415,519 A | 11/1983 | Strassel | | JP | 61-008349 | 1/1986 |
| 4,451,522 A | 5/1984 | de Vroom | | JP | 63-216717 | 9/1988 |
| 4,451,597 A | 5/1984 | Victorius | | JP | 1-028815 | 1/1989 |
| 4,465,717 A | 8/1984 | Crofts et al. | | JP | 50-019132 | 1/1993 |
| 4,474,845 A | 10/1984 | Hagerman et al. | | WO | WO 8100233 | 2/1981 |
| 4,496,628 A | 1/1985 | Deatcher et al. | | | | |
| 4,499,151 A | 2/1985 | Dowbenko et al. | | | | |
| 4,515,649 A | 5/1985 | Nussbaum | | | | |
| 4,548,857 A | 10/1985 | Galante | | | | |
| 4,578,426 A | 3/1986 | Lenz et al. | | | | |
| 4,585,701 A | 4/1986 | Bartoszek et al. | | | | |
| 4,595,551 A | 6/1986 | Maurer | | | | |
| 4,605,596 A | 8/1986 | Fry | | | | |
| 4,639,341 A | 1/1987 | Hanamoto et al. | | | | |
| 4,643,789 A | 2/1987 | Parker et al. | | | | |
| 4,652,470 A | 3/1987 | Das et al. | | | | |
| 4,656,098 A | 4/1987 | Yonekura et al. | | | | |
| 4,678,690 A | 7/1987 | Palmer et al. | | | | |
| 4,692,481 A | 9/1987 | Kelly | | | | |
| 4,769,100 A | 9/1988 | Short et al. | | | | |
| 4,786,350 A | 11/1988 | Nesbitt et al. | | | | |
| 4,810,540 A | 3/1989 | Ellison et al. | | | | |
| 4,818,589 A | 4/1989 | Johnson et al. | | | | |
| 4,828,637 A | 5/1989 | Mentzer et al. | | | | |
| 4,832,991 A | 5/1989 | Hayward et al. | | | | |
| 4,838,973 A | 6/1989 | Mentzer et al. | | | | |
| 4,868,030 A | 9/1989 | Mentzer et al. | | | | |
| 4,877,683 A | 10/1989 | Bragaw, Jr. et al. | | | | |
| 4,902,557 A | 2/1990 | Rohrbacher | | | | |
| 4,931,324 A | 6/1990 | Ellison et al. | | | | |
| 4,936,936 A * | 6/1990 | Rohrbacher ............... 156/239 | | | | |
| 4,943,680 A | 7/1990 | Ellison et al. | | | | |
| 4,957,802 A | 9/1990 | Mentzer et al. | | | | |
| 4,959,189 A * | 9/1990 | Rohrbacher et al. ........ 264/510 | | | | |
| 5,000,809 A * | 3/1991 | Adesko et al. .............. 156/230 | | | | |
| 5,114,789 A | 5/1992 | Reafler | | | | |
| 5,132,148 A | 7/1992 | Reafler | | | | |
| 5,203,941 A * | 4/1993 | Spain et al. ................ 156/209 | | | | |
| 5,342,666 A | 8/1994 | Ellison et al. | | | | |
| 5,725,712 A | 3/1998 | Spain et al. | | | | |
| 6,042,678 A * | 3/2000 | Johnson et al. ............ 156/246 | | | | |
| 6,254,712 B1 * | 7/2001 | Enlow et al. ......... 156/244.11 | | | | |
| 6,296,732 B1 * | 10/2001 | Enlow et al. ............... 156/209 | | | | |
| 6,336,988 B1 * | 1/2002 | Enlow et al. ............... 156/238 | | | | |
| 6,551,432 B1 * | 4/2003 | Spain et al. ................ 156/230 | | | | |
| 6,579,397 B1 * | 6/2003 | Spain et al. ................ 156/230 | | | | |
| 6,649,003 B1 * | 11/2003 | Spain et al. ................ 156/230 | | | | |
| 6,835,267 B1 * | 12/2004 | Spain et al. ................ 156/230 | | | | |

FOREIGN PATENT DOCUMENTS

| | | |
|---|---|---|
| EP | 0109313 | 5/1984 |
| EP | 0133119 | 2/1985 |
| EP | 0139187 | 5/1985 |
| EP | 0177829 | 4/1986 |
| EP | 0178096 | 4/1986 |
| EP | 0230364 | 7/1987 |
| EP | 0361546 | 1/1988 |
| EP | 0261815 | 3/1988 |
| EP | 0266107 A2 | 5/1988 |
| EP | 0266109 B1 | 5/1988 |
| GB | 1232971 | 5/1971 |
| GB | 2084513 A | 4/1982 |
| JP | 54-033561 | 3/1979 |
| JP | 54-127464 | 10/1979 |

OTHER PUBLICATIONS

Japanese Opposition by Rexham Industries Corp. against Japanese Patent Application No. 63-504355 and attached exhibits.

Japanese Opposition by Nissha Printing Co., Ltd. against Japanese Patent Application No. 63-504355 and attached exhibits.

Japanese Opposition by Minnesota Mining and Manufacturing Co. against Japanese Patent Application No. 63-504355 and attached exhibits.

Fuchs, "A State of the Art-Evaluation of Hot Stamping Decorative Plastic," *SME Technical Paper* No. FC 77-647 (1977).

Toyo Aluminum K.K., "The Orientation of Aluminum Pigments in Automotive Finishes," *Polymers Paint Colour Journal*, p. 796 (1980).

"Brilliant Performance", Rexham Corporation (1987).

"Solvent Cast Films," *Plastics Engineering*, pp. 29-33 (1987).

Affidative of Dennis Northrop, Oct. 12, 1992.

Affidavit of Victor H. Rampelberg and supporting exhibits, Oct. 12, 1992..

Anonymous "Research Disclosure" (1984).

Ullman et al., "Mechanical Properties of Blends of Polymethyl methacrylate and Polyvinylidene fluoride," *Composites Science and Technology* 23:97-112 (1985).

BP&R, pp. 29-30 (1985).

"Automotive Coatings: Helping Detroit Woo Customers," *Chemical Week*, p. 30 (1984).

"Dateline: Detroit SAE Show News Bulletins *Plastic body panels for tomorrow's cars, vans and trucks . . . ,*" *Plastics Technology*, pp. 103-107 (Apr. 1986).

*Automobiltechnische Aeitschrift*, 84:5 (May 1982).

"The Driving Force in Laminates," *Avery International Thermark*, (1985).

Miller, "Composite Structures: Next Wave in Detroit," *Plastics World*, pp. 30-34 (1986).

General Motors Painted Products Specification 9984065 (1985).

Chattha et al., "New Nonaqueous Dispersions for High Solids Base Coat/Clear Coat Paints," *J. Coatings Technol.* 57:41-44 (1985).

General Motors Painted Products Specification No. 9984052 (1982).

Bongaerts et al., "Flat Film Extrusion Using Chill-Roll Casting," *Plastics Extrusion Technology*, Hensen et al., eds., Hanser Publishers, New York, §§6.1-6.2 (1988).

*Modern Plastics Guide to Plastics*, McGraw-Hill, Inc., New York, pp. 32-34 (1981).

In the United States District Court, for the Western District of North Carolina, *Rexam Industries v. Avery Dennison*, Civil Action 3:94cv271-McK (1) Order dated Jan. 16, 1998, filed Jan. 20, 1998.

(2) Order dated Jan. 23, 1998, filed Jan. 23, 1998.
(3) Order dated Jan. 23, 1998, filed Jan. 27, 1998.
In the United States District Court, for the Western District of North Carolina, *Rexam Industries v. Avery Dennison*, Civil Action 3:94cc271-McK (1) Rexam's Motion No. 1 for Partial Summary Judgment Against Avery.
(2) "Memorandum of Law in Support of Rexam's Motion No. 1 for Partial Summary Judgment Against Avery".
(3) "Rexam's Motion No. 2 for Partial Summary Judgment Against Avery".
(4) "Memorandum of Law in Support of Rexam's Motion No. 2 for Partial Summary Judgment Against Avery".
(5) "Rexam's Motion No. 3 for Partial Summary Judgment Against Avery".
(6) "Memorandum of Law in Support of Rexam's Motion No. 3 for Partial Summary Judgment Against Avery".
(7) Joint Appendix Supporting Rexam's Motion Nos. 1, 2 and 3 for Partial Summary Judgment Against Avery (vol. I of II).
(8) Joint Appendix Supporting Rexam's Motion Nos. 1, 2 and 3 for Partial Summary Judgment Against Avery (vol. II of II).
(9) "Avery's Statement of Disputed Facts in Support of Avery's Oppositions to Rexam's Motions 1 and 2".
(10) "Memorandum of Law in Opposition to Rexam's Motion No. 1 for Partial Summary Judgment Against Avery".
(11) "Memorandum of Law in Opposition to Rexam's Motion No. 2 for Partial Summary Judgment Against Avery".
(12) "Memorandum of Law in Opposition to Rexam's Motion No. 3 for Partial Summary Judgment Against Avery".
(13) "Avery's Appendix of Documents in Opposition to Rexam's Summary Judgment Motions".
(14) "Rexam's Reply in Support of Its Motion No. 1 For Partial Summary Judgment Against Avery".
(15) "Rexam's Reply in Support of Its Motion No. 2 For Partial Summary Judgment Against Avery".
(16) "Rexam's Reply in Support of Its Motion No. 3 For Partial Summary Judgment Against Avery".
(17) "Supplemental Joint Appendix Supporting Rexam's Motion No. 1, 2 and 3 For Partial Summary Judgment Against Avery".
In the District Court of the United States for the Western District of North Carolina, Charlotte Division, *Rexam Industries Corp. v. Avery Dennison Corporation*, Civil Action 3:94CV271-MCK, "Order" dated Jan. 19, 2001, 55 pages.
European Opposition by Rexam Industries Corp. against European Patent No. EP 0352298 and attached exhibits.
European Opposition by Rexam Industries Corp. against European Patent No. EP 0285071 and attached exhibits.
Decision of United States Court of Appeals for the Federal Circuit *Rexam Industries Corporation v. Eastman Kodak Corporation and Avery Dennison Corporation*, decided mar. 14, 2002, before Mayer, Chief Judge, Clevenger and Gajarsa, Circuit Judges; Clevenger, Circuit Judge.

* cited by examiner

*Primary Examiner*—Sue A. Purvis
(74) *Attorney, Agent, or Firm*—Christie, Parker & Hale, LLP

(57) ABSTRACT

An automotive quality paint coat is laminated to the exterior surface of a molded plastic car body member or panel. In one embodiment, the paint coat includes an exterior clear coat above a color coat. During processing, the clear coat and color coat are each coated on a temporary flexible casting sheet and dried. A high gloss surface is transferred to the clear coat from the casting sheet. The paint coat is then transferred from the casting sheet to a thin, semi-flexible thermoformable plastic backing sheet by dry paint transfer-laminating techniques. The resulting laminate is thermoformed into a complex three-dimensional shape of the car body member or panel. The preformed laminate is then bonded to an underlying plastic substrate material, by injection-cladding techniques, for example, to form the finished article. The paint coat has sufficient elongation to retain exterior automotive appearance and durability properties during thermoforming without deglossing. The backing sheet absorbs defects in the substrate material so the paint coat retains its appearance and durability properties during the injection-cladding step. The finished article comprises a high gloss, defect-free paint coat on the exterior of a molded plastic car body member or panel. Solution-form polyvinylidene fluoride/acrylic paint systems have remarkably high combined gloss and distinctiveness-of-image levels, together with durability properties required for exterior automotive use.

2 Claims, 5 Drawing Sheets

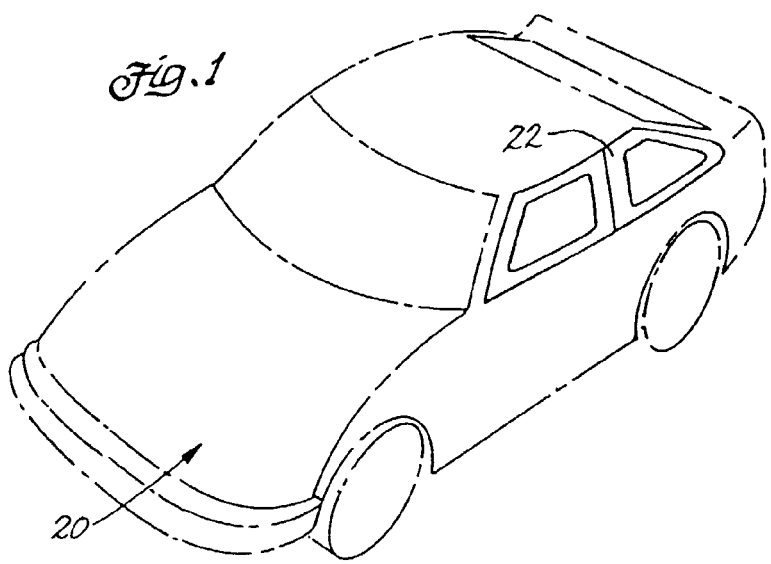
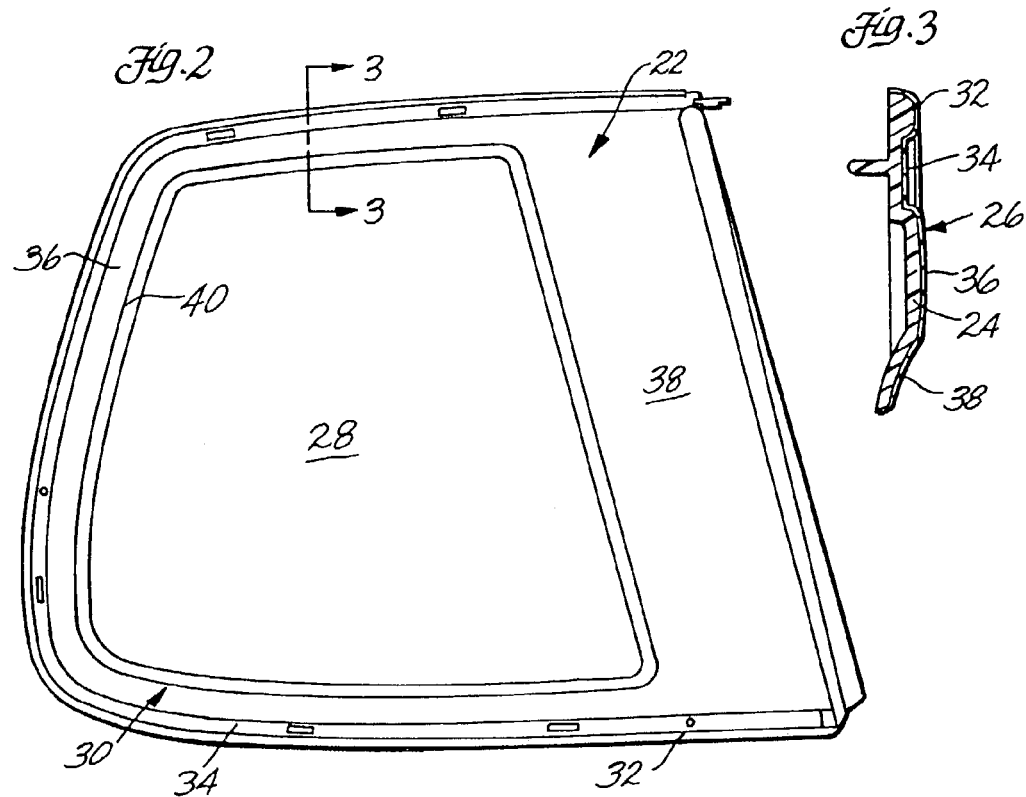
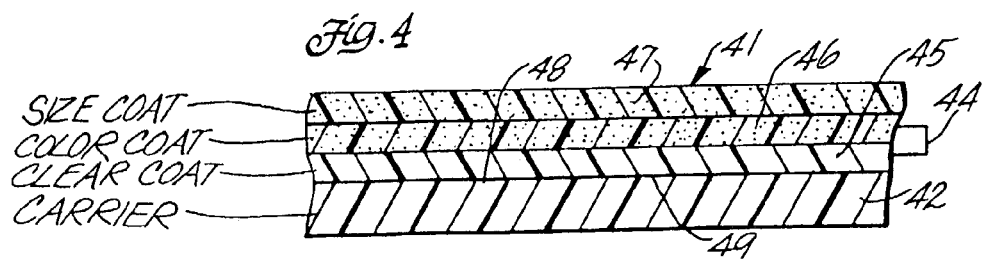

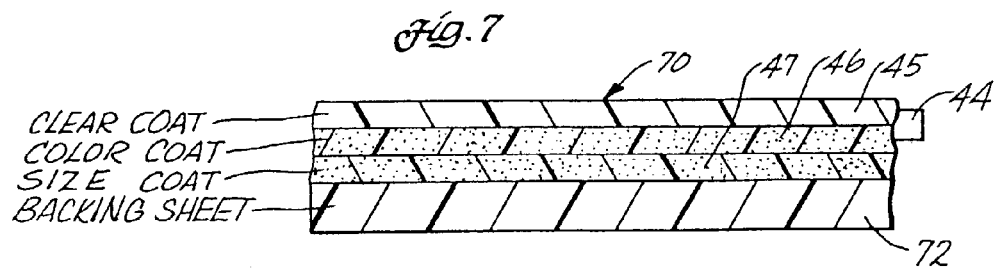
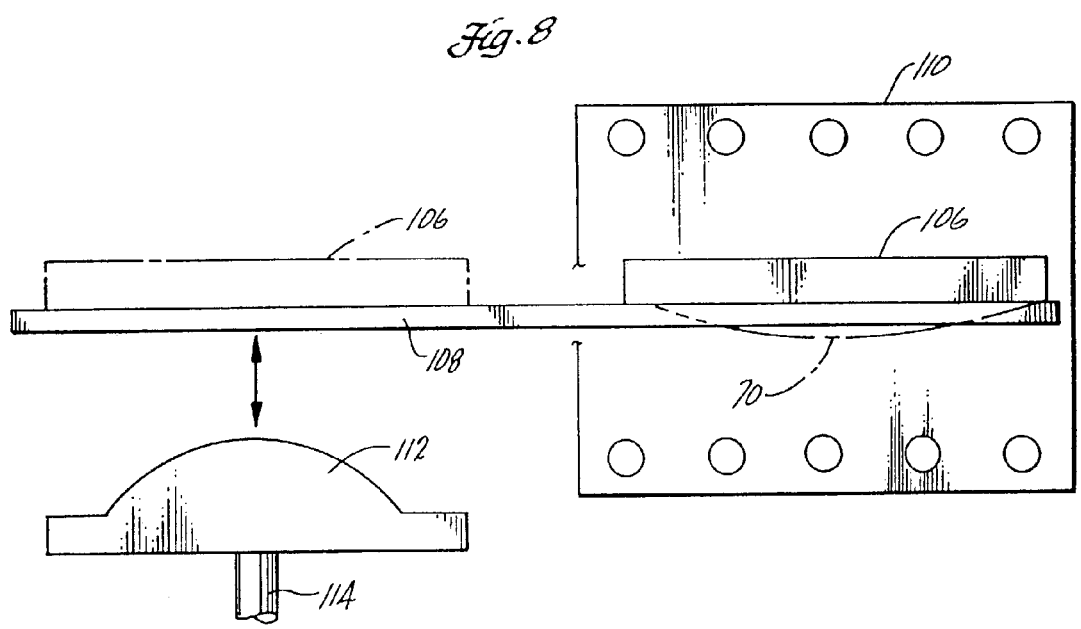
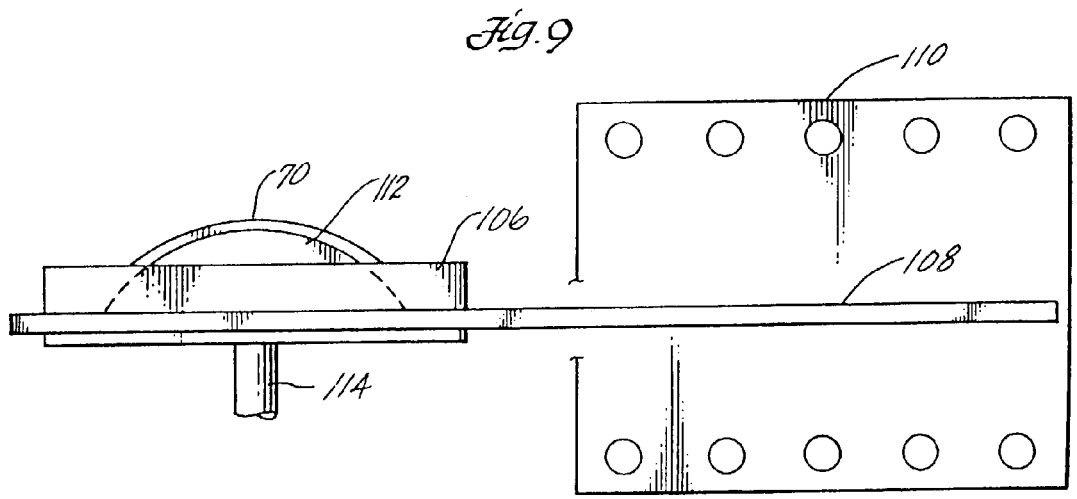

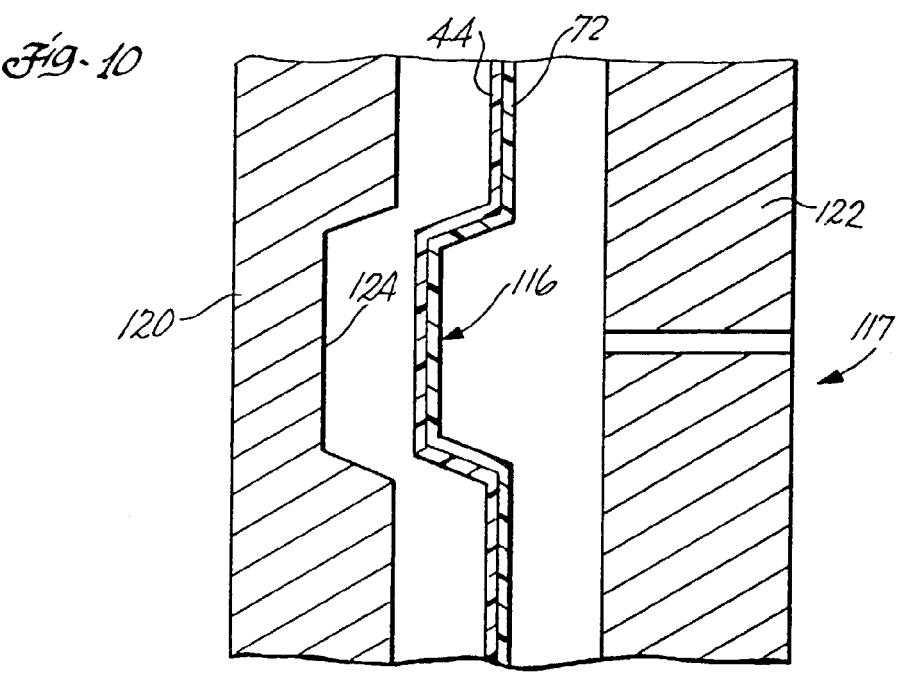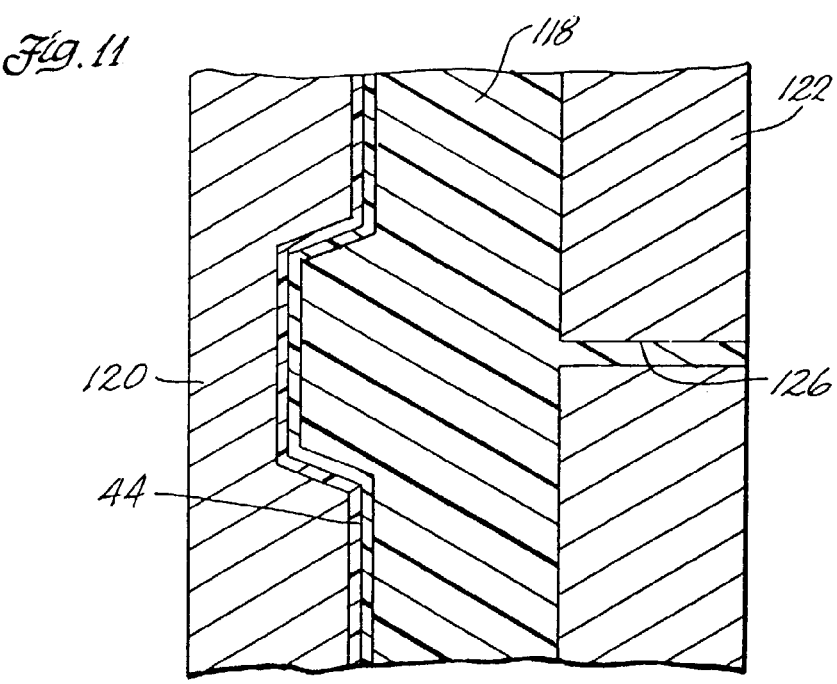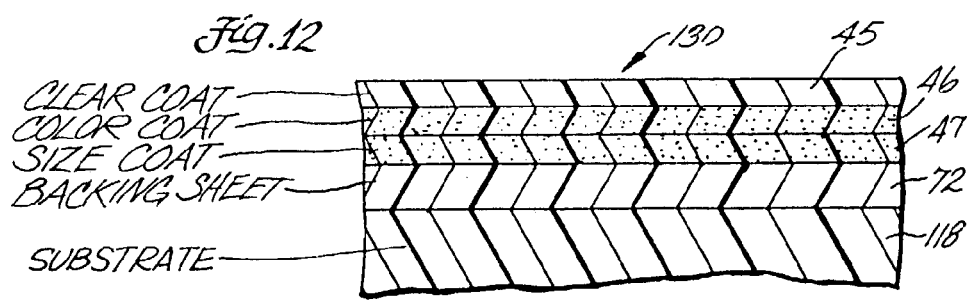

DRY PAINT TRANSFER PROCESS FOR MAKING DEEP-DRAW HIGH DOI AUTOMOTIVE BODY PANELS

CROSS REFERENCE TO RELATED APPLICATIONS

This application is a continuation of application Ser. No. 10/273,420, filed Oct. 17, 2002, now abandoned, which is a continuation of application Ser. No. 08/402,956, filed Mar. 13, 1995, now U.S. Pat. No. 6,579,397, which is a division of application Ser. No. 08/346,548, filed Nov. 29, 1994, now U.S. Pat. No. 6,835,267, which is a continuation application Ser. No. 08/179,765, filed Jan. 10, 1994, now abandoned, which is a continuation of application Ser. No. 08/025,827, filed Mar. 3, 1993, now abandoned, which is a continuation of application Ser. No. 07/873,708, filed Apr. 22, 1992, now abandoned, which is a continuation of application Ser. No. 07/424,302, filed Nov. 22, 1989, now abandoned, which is a continuation-in-part of application Ser. No. 07/162,917, filed Mar. 2, 1988, now abandoned, which is a continuation-in-part of application Ser. No. 07/031,984, filed Mar. 27, 1987, now abandoned.

FIELD OF THE INVENTION

This invention relates generally to dry paint transfer techniques, and more particularly to the use of these techniques to produce exterior plastic car body members or panels with a paint coat applied in a separate production operation which can eliminate or greatly reduce the painting steps carried out in the manufacturing operations of a conventional automobile production plant.

BACKGROUND

Automotive design and manufacture present a unique set of problems in the selection of materials and processes used in the manufacture of automobile bodies. As a form of transportation, automobiles are unique because most buyers want a vehicle to have a certain individual styling. A recent trend in the automobile industry is toward production of distinctive vehicles styled to attract specific groups of consumers. This change has required the car builder to shift production from a few models manufactured in large volumes to a larger number of more distinctive body styles. These developments have demanded from the manufacturer both styling flexibility and reasonable tooling costs for each body style.

For many years, car body members and panels have been made predominantly from sheet metal. However, car builders now generally recognize that future use of plastics for exterior car body members and panels, rather than sheet metal, may provide a solution to meeting the demand for more unique body styling and reduced tooling costs. With the increasing concern for weight-reduction, car builders have also turned their attention to the use of plastics as an alternative to heavier metal parts. For instance, certain exterior car body parts of many automobiles now on the road are made from lighter-weight plastic. These parts include bumpers, rocker panels, fender extensions, window and door moldings, and the like.

As reported in *Plastics World*, November, 1986, p.30 et seq., a number of advanced corporate development programs now in process are also seeking solutions to the problem of commercially manufacturing from plastics the larger exterior car body panels such as hoods, roofs, deck lids, and in fact, the entire car body, if possible. The concept of making a production car body from a material other than sheet metal dates back to at least as early as the mid-1950's, when the Chevrolet Corvette was first manufactured with a fiberglass body. Developments in plastic resin technology in recent years have resulted in more sophisticated plastic materials of higher impact strength than fiberglass. Polycarbonates are an example. These developments in plastics technology have caused many plastics manufacturers, for about the last decade or so, to seek solutions to the problem of commercially producing the entire car body at a reasonable cost from these later-developed high-strength plastic materials. Recent development efforts have also been directed toward producing plastic car bodies from various alternative plastics molding processes, including use of SMC (sheet molding compounds) and RIM (reaction injection molding) techniques.

Development of a production process for making exterior car body members and panels from plastics requires solutions to a number of technical problems. These parts must be manufactured at reasonable costs for tooling, assembly and materials. The end product also must meet certain quality requirements. For instance, the resulting car body panel must have structural capabilities such as impact strength and resistance to mechanical stress necessary to compete with sheet metal. It must also have a paint coat with a defect-free and durable exterior surface. An automotive quality paint coat must meet certain specifications for a large number of physical properties in order to be capable of use as an exterior automotive paint coat. These properties include gloss; distinctiveness-of-image; hardness; abrasion resistance; weatherability such as UV resistance; impact strength; thermal stability, namely, resistance to extreme high and low temperatures; gasoline and acid resistance; cleanability; adhesion to the underlying car body panel; resistance to water and humidity exposure; and hiding ability or opacity of the paint coat.

In the past, a conventional production process for applying an exterior paint coat to car bodies made of sheet metal has involved transporting the preformed auto bodies to application lines in the plant where the car bodies are dipped in paint, followed by transporting them to a separate location for baking the paint coat and waiting until the hardened paint coat dries thoroughly. Most paint systems today are acrylic enamels which are cross-linked into a hard, glossy, durable paint coat during baking. Following painting, the car bodies are transported back to the production plant for further assembly operations. The painting of plastic car body members has typically involved manually spray painting the plastic parts in a separate painting facility, followed by drying, and then transporting the finished parts back to the assembly operation. Conventional painting of sheet metal car bodies and plastic parts is expensive and is a significant factory problem with respect to environmental protection, workers' safety, corrosion treatment, and waste disposal. It is estimated that about one third of the total capital investment in an automobile production facility today is involved in painting car body members and panels.

In recent years, metalized laminating techniques have been used for forming a reflective, weather-resistant metal surface on molded plastic automotive trim parts. These techniques have not yielded plastic trim parts with a paint-coated surface capable of exterior automotive use. Such plastic trim parts have experienced difficulties in maintaining reflectivity and avoiding surface defects under mechanical impact and environmental exposure.

New car body applications of molded plastic materials can develop if the manufacturer can find a way to commercially produce plastic car body panels with a paint coat having the durability and appearance properties necessary for exterior automotive use. Moreover, if in mold painting or coating processes can be developed as an alternative to conventional auto painting, then auto assembly plants can be more compact, and capital costs and environmental and safety problems associated with conventional car painting at the factory site can be avoided.

Many corporate product development efforts have sought alternatives to conventional painting of molded plastic exterior car body panels and parts, but without any known success to date. A number of problems must be overcome to develop an economical production-type paint system and process for applying a paint coat capable of exterior automotive use for molded plastic exterior car body panels and parts so as to eliminate conventional spray painting operations. For instance, use of the cross-linked acrylic enamel paint systems which are commonly baked on the sheet metal car bodies to produce a tough, glossy finish cannot be used in painting plastic car bodies because of temperature limitations. One approach, which is the subject of this invention, involves developing a paint-coated laminate which can be used to replace the conventional painted finish on the exterior of an automobile body. The laminate is made from a paint coat applied to a casting sheet by paint coating techniques. The dried paint coat is then transferred from the casting sheet to a laminate panel by dry paint transfer techniques. The coating operation permits use of high temperature resistant paint systems capable of producing a tough, glossy finish. The laminate is later thermoformed into a complex three-dimensional shape and then bonded or integrally molded to an underlying plastic car body member or panel. Injection-cladding techniques can be used to manufacture a molded plastic part and simultaneously bond the laminate to the exterior of the molded plastic part.

A number of technical problems must be overcome in order to use such a laminate in a thermoforming and injection-cladding process, while maintaining a defect-free painted surface with high gloss and durability properties throughout the thermoforming and injection-cladding steps. For instance, the laminate must be heat and vacuum-formable into a complex three-dimensional shape without cracking, deglossing, stress whitening or creating other surface defects. A paint coat on such a laminate can require a substantial amount of pigment in order to provide the necessary color density or opacity and distinctiveness-of-image. However, it has been found that use of pigments in a paint coat can cause deglossing of the surface when a paint-coated laminate is thermoformed. Deglossing may even occur in a nonpigmented clear coat during thermoforming.

In addition to surface gloss requirements, the finished paint coat must Be defect-free. Defects must not be produced by the thermoforming step, and the laminate also must be bonded or molded to the underlying plastic substrate in a manner that hides any defects that may be present in the substrate material.

Moreover, a finished paint coat may have a reasonably high surface gloss, but still not have the desired visual appearance known as distinctiveness-of-image. This property relates to the mirror-like character of the finish and is measured by the clarity of an image reflected by the finished surface. It is difficult, in a thermoforming operation, to produce an exterior automotive paint coat with a high gloss level and a high distinctiveness-of-image.

Durability properties are also critical in producing a paint coat capable of exterior automotive use. The paint coat must avoid exhibiting defects when exposed to mechanical impact and avoid deterioration of the surface from exposure to chemicals and to the weather.

A paint system that produces the toughness or hardness necessary for exterior automotive use also must have the elongation properties and heat resistance necessary to allow thermoforming of the paint coat into complex three-dimensional shapes without cracking, deglossing, producing stress lines or other surface non-uniformities, or otherwise degrading the finish. Large pigment levels also adversely affect the strength and alter elongation properties of the paint coat. In addition, reliable bonding of the paint coat to the laminate and bonding of the laminate to the underlying substrate material are essential.

Thus, the desired paint system should have a critical combination of many physical properties in order to produce a surface capable of exterior automotive use, while retaining desired surface characteristics after the laminating, thermoforming and injection-cladding or molding steps have been carried out. However, some physical properties tend to be mutually incompatible in such a process. For instance, a paint system may have good qualities of durability such as hardness, toughness, weatherability and the like; but the same paint system may not have sufficient elongation to be heat-formed into a complex shape without cracking or otherwise losing its durability properties. Other paint systems may degloss when heat-formed into a complex shape. Some paint systems have sufficient elongation to permit thermoforming into the desired complex shape, but they are too soft and therefore lacking in the necessary hardness or durability properties.

In summary, there is a need for an economical production process for manufacturing highly contoured molded plastic exterior car body members or panels with a laminated paint coat having both the durability and the gloss and other appearance properties sufficient for exterior automotive use. Laminating techniques for applying a paint coat to such a molded plastic part can provide a valuable alternative to conventional painting of exterior car body members. Certain properties, such as glass-smooth, defect-free surfaces and uniform paint coats, are better produced by laminating techniques than by conventional painting. Capital costs also can be reduced and environmental problems can be alleviated. Laminating techniques require, in addition, however, a paint system and processing techniques capable of producing and maintaining, throughout processing, the durability and elongation properties, opacity, gloss and distinctiveness-of-image levels, and defect-free surface necessary for exterior automotive applications. The present invention solves these problems.

SUMMARY OF THE INVENTION

Briefly, one embodiment of this invention provides a process for manufacturing a molded plastic article having a finished paint coat with surface properties meeting criteria for exterior automotive use. These include properties providing predetermined durability, gloss and other appearance characteristics in the finished paint coat. In this process, the paint coat is applied to a three-dimensionally shaped exterior surface of an intermediate laminate by a combination of paint coating, dry paint transfer-laminating, and thermoforming techniques. The thermoformed laminate then can be bonded to or molded to an underlying plastic substrate, for example, by injection-cladding techniques, with the paint coat maintaining properties sufficient for exterior automotive use throughout these processing steps. The invention is described herein in the context of a paint coat applied to the surface of a plastic car body member or panel, but the invention is also applicable to other articles of manufacture having a paint coat with properties similar to those required for exterior automotive use.

Considering the application of the invention to a process for making a plastic exterior car body panel, a paint coat comprising a synthetic resinous material is coated in thin-film form onto a flexible, heat-resistant temporary casting sheet. The paint coat is dried on the sheet sufficiently to harden it and transfer a predetermined exterior surface gloss level from the casting sheet to the paint coat. The paint coat may comprise a clear coat and a separate pigmented color coat. The clear coat and color coat may be formed as separate thin-film coatings which are dried and then bonded to one another. The color coat, in combination with the clear coat, provides a composite paint coat having the durability, gloss and other appearance properties necessary for exterior automotive use. The paint coat is transferred to a semirigid, thermoformable synthetic resinous backing sheet so that the paint coat provides the exterior surface of the paint-coated backing sheet. The laminate formed by the backing sheet and the bonded paint coat is thereafter thermoformed to produce a three-dimensionally shaped preformed laminate, while still retaining durability, gloss and other appearance properties necessary for exterior automotive applications. The thermoforming step can produce substantial elongation of the paint coat. The paint coat is capable of elongating from about 50% to about 150%, or more, during thermoforming, without significant loss of its exterior automotive durability, gloss and other appearance properties. In a subsequent injection-cladding step, for example, a synthetic resinous substrate material is injection molded behind the preformed paint-coated laminate to bond the laminate to the substrate. This forms a molded plastic article with a painted surface which retains the exterior automotive surface characteristics. The substrate can be an exterior body panel of a motor vehicle. The substrate material normally may have a substandard surface finish, but the backing sheet absorbs surface defects in the substrate material during the injection-cladding step so as to retain the minimum surface defect level and gloss required of an exterior automotive paint coat.

In one embodiment, the paint coat comprises a fluorinated polymer and acrylic resin-containing paint system with thermoplastic properties. The relative amounts of the fluorinated polymer and acrylic resin components in the paint coat formulation provide a sufficient level of resistance to deglossing and sufficient elongation for the laminate to be thermoformed into complex three-dimensional shapes while providing sufficient durability and appearance properties for the finished product to be useful as an exterior automotive body member or panel.

In one embodiment in which the paint coat comprises an exterior clear coat and an underlying color coat bonded to the clear coat, the clear coat can be formed from a fluorinated polymer and acrylic resin-containing coating. In this case, the clear coat can provide the majority of the durability, gloss and other appearance properties necessary for use as an exterior automotive paint coat. The color coat also can comprise a thermoplastic fluorinated polymer and acrylic resin-containing paint system. Other paint systems compatible with the clear coat and the backing sheet also can be used.

In one form of the invention, the fluorinated polymer component comprises polyvinylidene fluoride (PVDF), and the acrylic resin component can be a polymethyl methacrylate resin, a polyethyl methacrylate resin, or mixtures thereof, including copolymers thereof. One finished product having a surface capable of exterior automotive use is made from a paint system comprising from about 50% to about 70% PVDF and from about 30% to about 50% acrylic resin, by weight of the total PVDF and acrylic solids, exclusive of the pigment.

This invention also provides an exterior automotive quality paint coat having unusually high gloss and distinctiveness-of-image (DOI) along with other durability properties sufficient for exterior automotive use. This embodiment of the invention includes a thermoformable laminate having a paint coat bonded to it in which the paint coat, prior to casting on a casting sheet, was prepared as a solution of vinylidene fluoride in acrylic resin. The paint coat comprises at least a clear coat of vinylidene fluoride and acrylic resin coated from solution, which produces thermoformed laminates with high combined gloss and DOI levels. Good combined gloss and DOI levels have been obtained experimentally when the clear coat and pigmented base coat both are prepared as a solution of vinylidene fluoride in the acrylic resin. In one experimental test of a finished car body panel, a 60° gloss level of greater than about 75 gloss units and a DOI approaching about 90 units were achieved.

Different forms of the invention are disclosed herein. One embodiment comprises a thermoformable laminate having a paint coat with properties capable of use in forming an exterior automotive finish on a plastic exterior car body panel. A further embodiment of the invention provides a process for applying a paint coat to an exterior body panel of a motor vehicle so that the paint coat in its finished form has the durability, gloss and other appearance properties necessary for exterior automotive use. Another embodiment of the invention comprises a pressure-sensitive adhesive-backed paint-coated laminate capable of use in automotive paint coat repair.

Thus, the present invention provides a process and articles of manufacture in which a laminated exterior paint coat ultimately forms an exterior finish on a highly contoured surface of a molded plastic article. The paint coat has a sufficient combination of elongation and resistance to deglossing to withstand thermoforming without disrupting the high gloss surface originally present, while retaining the durability and appearance properties sufficient to be useful as an exterior paint coat for a plastic car body panel.

These and other aspects of the invention will be more fully understood by referring to the following detailed description and the accompanying drawings.

DRAWINGS

FIG. 1 is a semi-schematic perspective view illustrating an automobile which may have one or more of its exterior body members or panels made from a molded plastic substrate having a paint coat produced according to principles of this invention.

FIG. 2 is a front elevation view-illustrating a rear window panel section of a motor vehicle in which an exterior paint coat is formed on the surface of the window panel according to principles of this invention.

FIG. 3 is a cross-section taken on line 3—3 of FIG. 2 for illustrating the complex three-dimensional shape of the paint coat transferred to the exterior surface of the window panel.

FIG. 4 is a schematic cross-sectional view illustrating one embodiment of a paint-coated carrier sheet used in the dry paint transfer-laminating steps of this invention. Film thicknesses are exaggerated in size and not to scale, for simplicity.

FIG. 7 is a schematic cross-sectional view illustrating a dry composite paint coat transferred to a backing sheet during the laminating step. Film thicknesses are exaggerated in size and not to scale, for simplicity.

FIG. 8 is a schematic view illustrating a thermoforming step of the process in which a paint-coated laminate is heated prior to vacuum forming.

FIG. 9 is a schematic view illustrating another thermoforming step in the process.

FIG. 10 is a schematic cross-sectional view illustrating a preliminary step in an injection-cladding step of the process.

FIG. 11 is a schematic cross-sectional view illustrating a substrate material injection-molded behind the thermoformed laminate in an injection mold.

FIG. 12 is schematic cross-sectional view illustrating the composite cross-sectional structure of the finished molded plastic article having exterior paint coat. Film thicknesses are exaggerated in size and not to scale, for simplicity.

DETAILED DESCRIPTION

Figure 5:
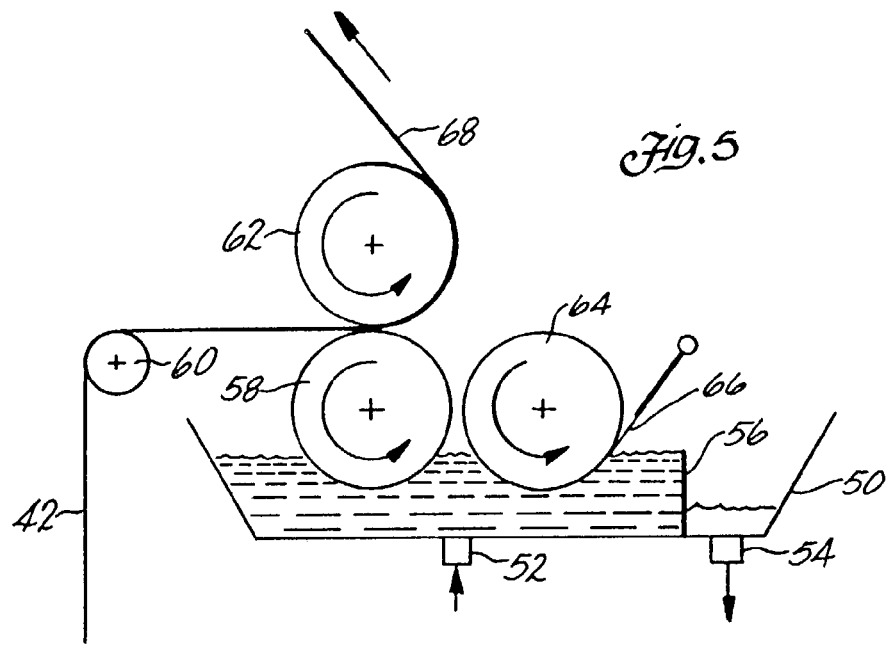
FIG. 5 is a schematic side elevation view illustrating a paint coating step of the process.

A paint coat with a surface capable of exterior automotive use is applied to a molded plastic article by a combination of paint coating, dry paint transfer-laminating, and thermoforming techniques for forming a paint-coated laminate which is then bonded to or molded to an underlying plastic substrate. The thermoformed laminate can be bonded to the substrate by injection-cladding techniques. The exterior automotive properties of durability, gloss and other appearance criteria are produced and maintained throughout the process.

FIGS. 1 through 3 illustrate one embodiment of the dry paint transfer process and product in which an exterior automotive paint coat is transferred to an exterior body member or panel of an automobile 20. In the illustrated embodiment, the paint coat is transferred to the exterior surface of a rear window panel or molding 22 of the vehicle The rear window molding can be injection-molded from a wood-filled synthetic resinous plastic substrate 24 which forms the structural portion of the panel. The paint coat 26 can be transferred to the exterior surface of the substrate by the paint coating, dry paint transfer-laminating, thermoforming and injection-cladding techniques described below. The paint coat 26 has properties useful in an exterior automotive paint coat, and these properties are also described in more detail below. Use of the process and article of this invention is described in the context of exterior car body members and panels, although other end uses of the process and article also are possible, without departing from the scope of the invention. For simplicity, exterior car body members or panels are referred to herein as car body panels.

The plastic substrate material 24 can contain large amounts of filler materials which can produce a normally substandard surface on the substrate. In carrying out the invention, the paint coat 26 is transferred to the surface of the substrate so that any imperfections in the underlying structural surface are absorbed by the laminate, thus presenting a perfectly smooth, unblemished paint coat having properties sufficient for exterior automotive uses. The rear window molding serves as an example of the type of highly contoured exterior surface to which the paint coat can be transferred. Referring to the rear window molding 22 in FIGS. 2 and 3, the molding has a large oblong-shaped window opening 28 with a wide border 30 having a highly contoured exterior surface extending around the window opening. The complexly shaped, multiple contour surface includes a curved outer ridge 32 of tapered cross-section extending around the periphery of the molding, a longitudinally curved and narrow recessed region 34 extending inside the outer ridge, and a wide border section 36 of raised elevation inside the recessed region 34 extending around the entire periphery of the window opening. The wide border region 36 is at the same elevation as the surface of a wide end member 38 at one of the window opening. An inside edge 40 of the wide border section 36 has a tapered cross-sectional thickness and extends around the inside of the window opening. As represented in FIGS. 2 and 3, the exterior automotive paint coat 26 is adhered to the complexly shaped exterior surface of the rear window molding, but the paint coat also can provide a durable, high gloss exterior surface useful on other car body panels of various irregularly shaped three-dimensional surface configurations, as well as other articles of manufacture.

Paint Coat

The process first includes the step of coating a paint coat, or a portion of a paint coat, onto one or more temporary carrier sheets. FIG. 4 illustrates one embodiment of a paint-coated carrier 41 which includes, in combination, a flexible, foldable, heat-resistant, self-supporting carrier sheet 42, also referred to in the art as a casting film; and a transferable, adherent, flexible paint coat 44 coated onto one surface of the carrier. The paint coat 44 is a non-self-supporting, flexible synthetic resinous dry film-form coating. The paint coat 44 can comprise a combination exterior clear coat and a color coat, or a combination exterior clear coat and a tint coat; or the paint coat may comprise a single dry film-form coating of a pigmented synthetic resinous material having the exterior automotive properties described below. In a presently preferred form, the paint coat 44 includes a clear coat 45 coated over the carrier and dried, and a color coat 46 on the dried clear coat. The color coat can be coated onto the dried clear coat. Alternatively, the clear coat and the color coat can be separately coated onto corresponding carrier she6ts and dried on their respective carriers. The color coat then can be later bonded to the clear coat. The combination clear coat and color coat are referred to herein as the paint coat 44, or a composite paint coat, for simplicity.

The paint-coated carrier also optionally can include a size coat 47 coated on the dried color coat. The size coat provides adhesion to a backing sheet in a subsequent laminating step. In one embodiment, described below, a thermoplastic polyolefin backing sheet is used, and a thermoplastic chlorinated polyolefin size coat provides superior adhesion between the paint coat and the backing sheet.

The carrier sheet 42 is preferably a polyester casting film having a high gloss surface 48. The carrier can be a polyester film such as Mylar (a trademark of DuPont), American Hoechst 3000 polyester film, or the like. The preferred film thickness of the carrier sheet is about two mils. Polyester films are preferred because the high gloss surface 48 is capable of transferring a high gloss level to a surface 49 of the clear coat 45 in contact with the carrier, where the transferred gloss level is sufficient for exterior automotive use. Alternatively, the coatings can be cast on a polished metal belt. If the color coat is cast on a separate carrier sheet, the surface gloss imparted to the color coat from the carrier is not critical. The polyester carrier film has a sufficiently high heat resistance to resist axial elongation under the temperatures applied during subsequent paint coat drying and laminating steps. The clear coat may be applied to the polyester carrier film without a release coat on the high gloss surface 48 of the carrier. This can avoid a separate coating, which might detrimentally affect transfer of the high gloss surface from the carrier to the surface 49 of the clear coat. The formulation of the clear coat is such that the clear coat can be easily transferred from the carrier sheet and can replicate the high gloss surface of the carrier after the clear coat dries and after subsequent dry paint transfer-laminating steps in which the paint coat is transferred from the carrier to a laminate described below.

As an optional step, a thin film of wax (not shown) can be coated onto the carrier sheet and dried, followed by coating the clear coat 45 over the thin film of wax. The wax is coated in a film thickness (less than 0.01 mil and preferably 0.001 mil) that avoids any adverse effect on the clear coat replicating the surface gloss of the carrier.

The clear coat 45 is a transparent or substantially transparent thermoplastic synthetic resinous coating composition coated in thin-film form onto the surface of the carrier sheet in a liquid state. Heat is later applied to the clear coat to dry it, without cross-linking the resin, while the clear coat is on the carrier. The preferred dry film thickness of the clear coat is about 0.5 to about 1.5 mils. Preferably, the clear coat is coated onto the carrier sheet by a reverse roll coating process illustrated in FIG. 5, although the clear coat can be applied by gravure printing, or other conventional coating techniques. Referring to the reverse roller coating process of FIG. 5, the clear coat lacquer 46 is contained in a coating pan 50 having a lacquer inlet 52 in the main portion of the pan and a lacquer drain 54 on an opposite side of a weir 56. An applicator roll 58 rotates to pick up the lacquer from the pan and coat it onto a previously uncoated polyester film 42 which passes over a guide roll 60 and then passes between the applicator roll and a rubber backup roll 62. A metering roll 64 adjacent the applicator roll rotates in the same direction as the applicator roll. A doctor blade 66 wipes the surface of the metering roll to properly control the thickness of the coating on the applicator roll. The adjustable gap between the metering roll and the applicator roll controls the thickness of the coating on the surface of the applicator roll. The coating picked up by the applicator roll is then coated onto the polyester film 42 as the film passes into contact with the reverse-rotating applicator roll. The applied coating on the film is shown at 68. The coated film then passes to a drying oven.

The clear coat is dried at oven temperatures in the range from about 250° F. to about 400° F. Preferably, the clear coat is dried in multiple zones spaced apart along the long axis of the paint-coated carrier, in line with the reverse roll coater. A preferred drying technique involves use of three heating zones, with a progressively higher temperature applied in each successive zone. The solvent gases contained in the clear coat are essentially all driven off in the multi-stage drying process. The same multi-stage drying process is used for drying the color coat 46 and the size coat 47. The polyester carrier is resistant to heat at temperatures greater than about 450° F., so the carrier does not deform during the drying step. The polyester carrier film thickness of about two mils assists the film in resisting elongation during the drying steps. This ensures a high gloss level being replicated by the surface 49 of the dried clear coat from the high gloss surface 48 of the carrier. This also makes it possible to use high temperature-resistant, high gloss paint systems which cannot be applied to and dried on plastic substrates directly because of temperature limitations of the plastic materials.

The clear coat formulation produces a dry film-form exterior film which, in combination with the underlying color coat, produces a composite paint coat having properties useful as an exterior automotive paint coat. Such a paint coat is principally characterized by a combination of exterior automotive durability properties and gloss and other appearance properties of the finished paint coat. The specifications for a paint coat for exterior automotive use, as defined herein, include the mechanical properties of hardness; abrasion resistance; thermal stability, including heat resistance; resistance to gasoline and acids; cleanability; adhesion; certain weatherability properties such as UV resistance and resistance to water and humidity exposure; and impact strength. For simplicity, these properties are referred to collectively herein as "durability properties".

Weatherability, which is measured, in part, by UV resistance properties, is a durability property commonly used in the art to define standards for an exterior automotive paint coat. To measure UV resistance can require long-term exposure testing of the paint coat, for a period of two years in one test method. Certain long-term UV tests of the paint coat of this invention have not been completed to date, but other short-term accelerated UV resistance and weatherability tests of the paint coat have been completed and are described below.

In addition to durability properties, the specifications for an exterior automotive quality paint coat also include tests to measure the visual appearance qualities of the finished surface. These criteria include gloss, distinctiveness-of-image (DOI), dry film thickness and hiding ability or opacity of the paint coat. These properties are referred to collectively herein as "gloss and other appearance properties".

Thus, a paint coat can have a combination of predetermined physical properties that collectively define whether the paint coat is capable of use as an exterior automotive paint finish. Generally, the paint coat of this invention, in dry film-form, provides a combination of the above-described durability and appearance properties, including gloss, which enables the paint coat to function as an exterior automotive paint coat.

The criteria used to define whether a paint coat is sufficient for exterior automotive use are not uniform throughout the automobile industry. Certain standards can vary from one auto manufacturer to the next, and from one car model, to the next for a given auto manufacturer. Most criteria used to define an exterior automotive quality surface for the process of this invention have been adopted from specifications and test methods used in certain General Motors Fiero and Pontiac Grand AM test programs. These criteria are disclosed herein as an example of techniques that can be used to measure whether a paint coat has sufficient properties for exterior automotive use, although other combinations of test criteria and test methods can also be used for this purpose. The specifications and test methods for measuring the properties of the exterior automotive paint coat of this invention are described in detail below.

In addition to the properties of durability and appearance, the clear coat formulation also imparts to the composite paint coat sufficient elongation at thermoforming temperatures to enable the paint coat to be thermoformed into complex three-dimensional shapes without deglossing of the clear coat and without reducing any durability property below that required for an exterior automotive surface. In one embodiment, the paint coat is thermoformed at temperatures from about 280° F. to about 450° F. A laminate having the clear coat as its exterior surface is capable of being thermoformed at these temperatures while maintaining the durability and appearance properties of the composite paint coat. Elongation of the paint coat can be substantial when foxing the complex three-dimensional shapes of the finished article. Elongation of the clear coat (and the composite paint coat) can be greater than about 50%, and often greater than 100%, to form a highly contoured finished article. Plastic car body meters and panels often require such deep draw forming. The clear coat also is capable of maintaining the durability and appearance properties of the paint coat during a subsequent injection molding step.

The clear coat is formulated from a transparent thermoplastic (non-cross-linked) synthetic resinous coating composition. The thermoplastic properties allow the clear coat, in dry film-form, to soften and deform and be vacuum-formable at thermoforming temperatures, while still retaining exterior automotive durability properties, gloss and other appearance properties after the heated and three-dimensionally shaped film-form coating returns to its stable or hardened condition. In dry film-form, the clear coat has an extensibility in the range from about 40% to about 150% or more, at a film thickness from about 0.5 to about 1.5 mils, and at thermoforming temperatures from about 280° F. to about 450° F.

In one embodiment, the clear coat comprises a blend of a thermoplastic fluorinated polymer and an acrylic resin. The clear coat preferably contains the fluorinated polymer and acrylic resin as its principal components. The fluorinated polymer component is preferably a thermoplastic fluorocarbon such as polyvinylidene fluoride (PVDF). The fluorinated polymer also can include copolymer and terpolymers of vinylidene fluoride. One thermoplastic fluorocarbon useful in the clear coat is the polyvinylidene fluoride known as Kynar, a trademark of Pennwalt Corp. This polymer is a high molecular weight (400,000) polymer which provides a useful blend of durability and chemical resistance properties. Generally, a high molecular weight PVDF resin, with a weight average molecular weight of about 200,000 to about 600,000 is used.

The acrylic resin component of the clear coat can be a polymethyl methacrylate, or a polyethyl methacrylate resin, or mixtures thereof, including methacrylate copolymer resins, and minor amounts of other comonomers. The clear coat also can include minor amounts of block copolymers and/or compatibilizers to stabilize the blended PVDF and acrylic resin system and provide compatibility between films.

In one embodiment, a principal component of the acrylic resin contained in the clear coat is a medium molecular weight polymethyl methacrylate resin such as Elvacite 2010, a trademark of DuPont. (In all further references to Elvacite resins herein, it should be noted that Elvacite is a trademark of DuPont for a group of its acrylic resins.) In another embodiment, a principal component of the acrylic resin for the clear coat can be a high molecular weight polyethyl methacrylate resin such as Elvacite 2042. The acrylic component of the clear coat also can comprise a mixture of Elvacite 2010 and a medium-to-high molecular weight polymethyl methacrylate resin such as Elvacite 2021. In a further embodiment, the acrylic resin component can comprise Elvacite 2042 and a low molecular weight polyethyl methacrylate resin such as Elvacite 2043. Other similar combinations of acrylic resins, their homopolymers and copolymers, may be used as a component of the clear coat. Generally, the acrylic resin component has a relatively high weight average molecular weight of about 50,000 to about 400,000.

The PVDF and acrylic-based clear coat formulation can be prepared as a solution of PVDF in the acrylic resin and solvent. Experimental tests of finished car body panels, in which the paint coat has been prepared from a solution of PVDF in acrylic resin, have demonstrated high levels of gloss and distinctiveness-of-image. The experimental text results are described in Example 11 below.

The PVDF and acrylic-based clear coat formulation also can be prepared as a dispersion of the PVDF in a solution of the acrylic resin. In one embodiment, the clear coat formulation can be prepared by mixing the acrylic resin with a suitable organic solvent and applying heat to dissolve the resin. The mixture is then allowed to cool sufficiently before adding the PVDF component so that the PVDF will not dissolve, but will be maintained as a dispersion in the acrylic-solvent based mixture. By maintaining the PVDF component as a dispersion in the clear coat, solvent evaporation during drying of the clear coat can be improved.

A preferred composition of the dried clear coat comprises from about 50% to about 70% PVDF, and from about 30% to about 50% acrylic resin, by weight. In some instances the maximum content of the PVDF component is about 65%, with the balance essentially comprising the acrylic resin. These solids ranges are based on the relative proportions of the PVDF and acrylic components only in the clear coat formulation. Other minor amounts of solids, such as UV stabilizers, block copolymers and compatibilizers also may be contained in the clear coat formulation.

In one embodiment, a successful experimental car body panel having exterior automotive surface properties was produced from a paint system in which the dried clear coat consisted essentially of about 50% PVDF and about 50% polymethyl methacrylate resin, by weight. This clear coat provided high gloss (after thermoforming) and good exterior automotive properties of appearance and durability. In another successful experimental car body panel having good exterior automotive appearance and durability properties, including gloss, the dried clear coat consisted essentially of about 65% PVDF and about 35% polyethyl methacrylate resin, by weight.

The acrylic resin component of the clear, coat is desirable because of its compatibility with the PVDF in dry film form. The acrylic component is added to the PVDF in an amount that prevents deglossing of the finished clear coat during thermoforming. The acrylic resin is also added in an amount that yields a transparent clear coat in dry film form. Generally speaking, transparency and distinctiveness-of-image of the composite paint coat increase in proportion to the amount of acrylic resin added to the PVDF-acrylic system. It has been determined that a pure PVDF clear coat has reasonably good properties of durability and elongation, but such a 100% PVDF coating is not normally transparent and it deglosses excessively when heated to normal thermoforming temperatures. When sufficient acrylic resin is added to the PVDF component, the resulting clear coat becomes reasonably transparent and can resist deglossing at thermoforming temperatures. Increased transparency of the clear coat improves the gloss level of the finished clear coat. The acrylic resin is also combined with the PVDF in an amount that maintains sufficient elongation to allow the clear coat (and the color coat to which it is bonded) to be thermoformed (as part of the laminate described below) into complex three-dimensional shapes, while retaining the exterior automotive durability properties and appearance properties, including gloss, of the finished paint coat. It has been determined that a dry film-form PVDF-acrylic-based clear coat containing more than about 35% acrylic resin and less than about 65% to 70% PVDF, by weight of the total PVDF and acrylic solids, avoids deglossing during thermoforming while achieving sufficient elongation.

It is believed that deglossing of a PVDF and acrylic resin-based clear coat, in some instances, can be caused by crystallization of the clear coat as it cools down after thermoforming. Greater crystallization of the PVDF-acrylic-based clear coat also is believed to be caused, at least in part, by proportionately higher thermoforming temperatures. Addition of the acrylic resin to the PVDF in the clear coat formulation may prevent crystallization of the PVDF in cool-down from thermoforming at normal thermoforming temperatures. Use of polymethyl methacrylate as the predominant component of the clear coat acrylic resin may be desirable because it produces a higher gloss level than polyethyl methacrylate. It is believed that the higher gloss results from a slower rate of crystallization of the polymethyl methacrylate during cooling. It is also believed that deglossing, in certain instances, may be caused by microcracking of the clear coat surface during thermoforming. Use of a certain amount of softer acrylic resin than polymethyl methacrylate, such as polyethyl methacrylate, may in some instances produce a high gloss surface of the clear coat after thermoforming, particularly in combination with lower thermoforming temperatures.

To the extent that deglossing of the clear coat may be caused by non-uniform coalescence of the PVDF component in the resin system, it is believed that this problem can be overcome by a more uniformly blended dispersion of the PVDF in the acrylic resin or use of a solution-based system.

The PVDF component of the clear coat is desirable because of the exterior automotive durability properties and the elongation properties it provides in the resulting clear coat, particularly in combination with the acrylic resin component. The PVDF component also provides good weatherability properties in the finished paint coat. It has been determined that a pure thermoplastic acrylic resin clear coat can provide good hardness or toughness characteristics, but it lacks weatherability. A pure acrylic resin clear coat also creates difficulties in separating from the injection mold after the injection-cladding step. A cross-linked thermoset acrylic resin commonly used as an exterior auto paint is not useful in the process of this invention. When thermoformed, it shatters or cracks when a vacuum is drawn on the laminate to which it is coated. A dry film-form PVDF and acrylic resin-containing clear coat having from about 30% to about 50% acrylic resin (by weight of the total PVDF-acrylic-based solids) has sufficient elongation to allow proper thermoforming and injection-cladding, while maintaining the exterior automotive durability, gloss and other appearance properties of the finished composite paint coat.

The color coat 46 is bonded to the clear coat after the clear coat has been dried on the carrier sheet. The color coat can be coated onto the dried clear coat, or the color coat can be coated onto a separate polyester casting film, dried, and later transferred from the casting film to the clear coat. In either case, the color coat is preferably applied to the casting film by reverse roller coating techniques similar to those illustrated in FIG. 5. A preferred dry film thickness of the color coat is in the range of about 0.5 to about 1.5 mils. The color coat comprises a thermoplastic synthetic resinous coating composition containing a sufficient amount of pigment to provide the appearance necessary for exterior automotive use in the finished article. More specifically, the color coat contains a sufficient amount of pigment so that the composite paint coat maintains sufficient opacity and distinctiveness-of-image and avoids stress whitening throughout the thermoforming step so to function as an exterior automotive paint coat. The resinous material contained in the color coat functions in combination with the clear coat to produce the required exterior automotive surface for the finished paint coat. That is, although the clear coat provides the exterior surface portion of the finished paint coat, the exterior automotive properties of the finished surface are not controlled solely by the clear coat formulation. The underlying color coat can affect durability properties of the finished paint coat, for example. Abrasion resistance is an example of a mechanical property enhanced by a tougher color coat in combination with the exterior clear coat. Weatherability of the finished paint coat also is influenced by the color coat formulation as well as the clear coat. The color coat also comprises a resinous material which is capable of sufficient elongation at thermoforming temperatures so as to not disrupt the exterior automotive properties of the finished paint coat.

The color coat is preferably dried by passing it through the same multiple heating zones used in drying the clear coat. Drying temperatures in each of the zones are progressively increased and can be at about the same temperatures as those used for drying the clear coat. Preferably, similar resinous components with mutually compatible solvents are used in the clear coat and color coat so that adhesion between the clear coat and color coat is produced without requiring additional stabilizers or additives. The color coat composition is preferably a synthetic resinous coating composition having thermoplastic properties similar to the clear coat. Although the color coat alone does not necessarily require all of the exterior automotive properties of durability and appearance, in order to produce a useful composite paint coat, a color coat composition (exclusive of the pigment contained in the coating) having most of the desirable exterior automotive durability properties is preferred. In one embodiment, the color coat comprises a blended thermoplastic fluorinated polymer and acrylic resin-containing paint system. This paint system can be similar to the PVDF and acrylic-based coating used in the clear coat. The fluorinated polymer component also can include copolymers and terpolymers of vinylidene fluoride. The color coat formulation can be prepared by mixing the acrylic component with suitable organic solvents and applying heat to allow the acrylic resin to dissolve. In a preferred embodiment the PVDF component is dissolved in the acrylic resin solution, although the PVDF can be maintained as a dispersion in the acrylic-based system. The pigment is then added to the PVDF-acrylic composition. Preferably, the composition of the dried color coat (the PVDF and acrylic-based solids, exclusive the pigment) comprises from about 50% to about 70% PVDF and from about 30% to about 50% acrylic resin, by weight of the total PVDF and acrylic solids. In a preferred dispersion formulation, the dried color coat comprises about 65% PVDF and about 35% acrylic resin, by weight. The preferred acrylic component for the color coat is a polyethyl methacrylate resin such as Elvacite 2042 or Elvacite 2043, or mixtures thereof. The relatively higher amount of PVDF in the color coat produces a softer film and therefore enhances elongation properties.

The color coat may contain a substantial pigment level in order to provide sufficient opacity to maintain desirable coloration in the finished article. In a highly contoured three-dimensionally shaped article, a large amount of pigment may be necessary for hiding, following subsequent thermoforming steps. For most colors, a pigment level from about 3% to about 30%, by weight of the solids contained in the coating, also referred to as the pigment-to-binder ratio, produces the desired opacity in the finished paint coat. The amount of pigment used varies depending upon the color. For a red color coat used in an experimental car body panel, for example, a pigment level of about 23%, by weight of the total solids, was used. For a black color coat using carbon black pigment in an experimental car body panel, about 3% to 5% pigment was used.

The pigment contained in the color coat can affect exterior automotive properties. For instance, if the color coat is applied to a laminate as a single paint coat, or is applied to the laminate as an exterior paint coat, the pigment contained in the coating can cause the color coat to degloss during thermoforming of the laminate. (Under these circumstances, the same coating applied as a clear coat may not degloss during the same thermoforming step.) It has been discovered that a finished paint coat with a high gloss level can be produced with a non-deglossing exterior clear coat applied over a color coat which otherwise deglosses by itself during thermoforming. Stated another way, a color coat which normally deglosses as an exterior coat may be used as an underlying color coat for an exterior clear coat, if the clear coat can, following thermoforming, produce the gloss necessary for exterior automotive use.

As to the deglossing phenomenon, it has been discovered that an otherwise high gloss exterior surface of a color coat, applied to a laminate in a flat (planar) coating of uniform thickness usually deglosses when the laminate is thermoformed into a complex three-dimensional shape. It is believed that such deglossing is caused by the particles added to the coating as pigment penetrating the exterior surface of the coating during the softening and elongation that occur during thermoforming. It has also been discovered that such deglossing can be overcome by coating (or laminating) the exterior clear coat over the color coat at sufficient film thickness that the clear coat can act as a barrier to prevent the color coat pigment particles from migrating from the color coat through the clear coat and penetrating the surface of the clear coat during the thermoforming step.

The high pigment level in the color coat also can affect mechanical properties of the coating, such as durability and elongation. Generally, the high level of pigment contained in the color coat reduces elongation of the coating. The pigment also can reduce the strength or hardness of the coating. A color coat which may, by itself, not have all of the durability properties of an exterior automotive paint coat, can still be useful in the finished article. However, elongation properties are critical because the color coat should not inhibit elongation of the clear coat during thermoforming. If the amount of PVDF component in the color coat is at least about the same or greater than the amount of the acrylic component in the color coat, elongation properties of the color coat are enhanced. In addition, the acrylic component of the color coat formulation can be a high molecular weight, high-strength resin to add back to the color coat the hardness or strength characteristics lost by the addition of the pigment to the color coat. The greater amount of PVDF in the color coat also can improve weatherability of the finished paint coat.

Thus, the desired color coat formulation provides the appearance and durability properties which, in combination with the clear coat, produce a composite paint coat having the properties suitable for exterior automotive use. The color coat also retains sufficient elongation to be thermoformed in combination with the clear coat so that the durability and appearance properties, including gloss, of the finished paint coat are not degraded during thermoforming. In one embodiment, an experimental car body panel was made from a color coat having PVDF in the range of about 50% to about 70%, and a high molecular weight polyethyl methacrylate resin in the range of about 30% to about 50%, by weight of the total (non-pigment) solids. This combination produced durability and appearance properties, including gloss, in the finished paint coat sufficient for exterior automotive use.

As an alternative to the PVDF and acrylic resin combination, the color coat also can contain other formulations. It is believed that a flexible pure acrylic resin with the required elongation properties, or certain softer acrylic copolymers or acrylic dispersion lacquers having sufficient elongation and durability properties (especially weatherability) also can be useful as a color coat formulation. It is also believed that certain urethanes and vinyl compositions such as polyvinyl chloride can provide binders for acceptable color coats. Use of a separate color coat not containing a fluorinated polymer such as PVDF can reduce the cost of the finished paint coat.

Although the paint coat has been described in relation to a clear coat and a separate color coat, the paint coat of this invention also may be produced as a single pigmented thermoplastic synthetic resinous coating, with the pigment highly dispersed in the coating so that deglossing upon thermoforming is resisted. Alternatively, a clear coat having the required durability and appearance properties may be used in combination with an underlying coating or other substrate material which provides the coloration and other properties necessary for the combination to produce a finished paint coat suitable for exterior automotive use.

The size coat 47 is next coated onto the dried color coat, either when the color coat is coated on the clear coat, or when the color coat only is coated on a separate casting sheet. The size coat bonds the paint coat to the backing sheet used in the laminating step described below. The size coat comprises any synthetic resinous material which is heat-activated from the subsequent laminating step to bond the paint coat to the backing sheet. The preferred dry film thickness of the size coat is from about 0.1 to about 1.0 mil. The size coat is preferably applied as a thermoplastic and dried in the same multi-stage drying step used in drying the clear coat and the color coat. The size coat is dried at a temperature which evaporates the solvent without cross-linking the resin. The size coat composition can vary depending upon the composition of the color coat and the backing sheet to which the paint coat is bonded. For a PVDF-acrylic-based paint coat, an acrylic resin-based size coat is preferred for suitable bonding of the paint coat to the backing sheet. In one embodiment, in which the paint coat is adhered to a backing sheet made of acrylonitrile-butydiene-styrene (ABS), the size coat comprises a polymethyl methacrylate resin such as Acryloid A-101 (a trademark of Rohm and Haas Co.) dissolved in a suitable solvent. In another embodiment in which the backing sheet is a thermoplastic polyolefin, the size coat preferably comprises a chlorinated polyolefin.

Transfer to Thermoformable Backing Sheet

Figure 6:
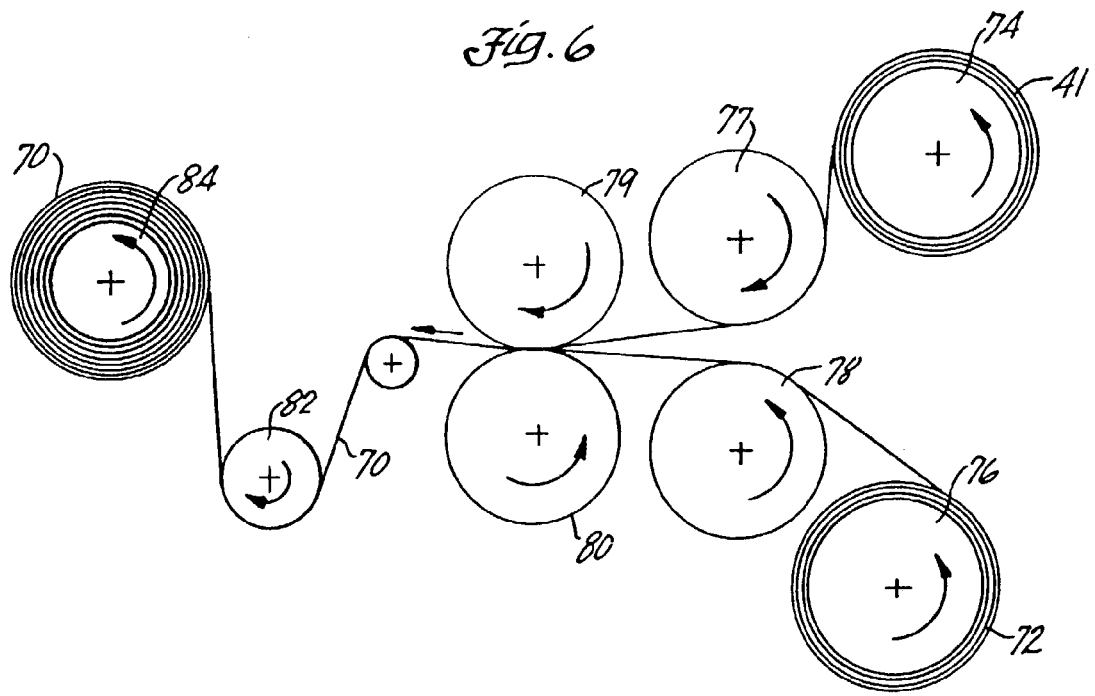
FIG. 6 is a schematic side elevation view illustrating a laminating step of the process.

The paint-coated carrier illustrated in FIG. 4 is next laminated to a thermoformable backing sheet by dry paint transfer-laminating techniques. The laminating step is illustrated in FIG. 6. FIG. 7 schematically illustrates a thermoformable laminate 70 formed after the dry paint transfer-laminating step. The laminate 70 includes the composite paint layer 44 (clear coat and color coat) adhered to a backing sheet 72 by the size coat 47. The backing sheet, is preferably a semirigid, self-supporting, thin, flat sheet of a synthetic resinous material. The backing sheet is made from a material which is compatible with an injection-molded plastic material later used to form the structural substrate base of the finished article. Preferably, the backing sheet is made from the same or substantially the same polymeric material as the substrate base of the finished article. The backing sheet also is made from a material having a thickness capable of thermoforming into a complex three-dimensional shape, along with the adhered composite paint coat, without disrupting the exterior automotive properties of the paint coat. The material from which the substrate is molded can contain a substantial amount of filler and therefore can produce an imperfect surface on an article molded from the substrate material. The laminate 70 is adhered to the otherwise imperfect surface of the molded substrate to improve the surface characteristics of the substrate panel and produce an outstandingly smooth controlled exterior automotive finish. The multi-layered article in its finished form comprises a high performance essentially defect-free, three-dimensionally shaped paint coat with exterior automotive properties in combination with the backing sheet 72, which provides a buffer layer between the substandard surface of the substrate and the finished paint coat. The backing sheet material minimizes the surface imperfections transmitted to the paint coat. The preferred material from which the backing sheet is made is ABS. A preferred ABS material is Borg Warner's Cycolac L.S. Thermoplastic polyolefins (TPO's) including polypropylenes and polyethylenes also may be used, as well as polyesters or an amorphous nylon, such as Bexloy C-712, a trademark of DuPont. Use of TPO backing sheets and substrates in a composite structure is described in greater detail below. The thickness of the backing sheet can vary, but generally it is necessary for the backing sheet to have a sufficient thickness to isolate or absorb imperfections in the surface of the underlying substrate while presenting a perfectly smooth upper surface of the paint coat. The backing sheet is also not so thick that it would otherwise disrupt the elongation characteristics of the laminate during the subsequent thermoforming step. A desirable range of thickness of the backing sheet is believed to be from about 10 to 30–40 mils, with 20 mils being a preferred thickness for an ABS sheet, for example.

The laminating step is best understood by referring to the schematic view of FIG. 6, in which the paint-coated carrier 41 is shown stored on a top unwind roll 74 and a flexible 20 mil thick ABS backing sheet 72 is stored on a bottom unwind roll 76. The paint-coated carrier, in one embodiment, comprises the clear coat and color coat on a single flexible casting sheet. The paint-coated casting sheet 41 is passed around a drum 77, and the backing sheet 72 passes around a drum 78. The carrier and backing sheet then pass between a heated laminating drum 79 and a rubber backup roll 80. The laminating drum 79 is preferably made of steel and is preferably operated at a temperature of about 400° to 425° F. It is pressed into contact with the overlapping sheets to heat them to a temperature sufficient to activate the adhesive in the size coat and press the two sheets into contact with each other to bond the paint coat to the backing sheet. The rubber backup roll 80 is pressed into contact with the laminating roll, preferably at a pressure of about 300 pounds per lineal inch. The slow speed at which the sheets travel during laminating ensures that the resulting laminate 70 is heated to a temperature approaching the temperature of the laminating drum. This softens the backing sheet material somewhat as well as activating the heat-activated size coat to ensure a complete bond between the paint coat and the backing sheet. The polyester carrier sheet of the paint-coated carrier has a heat-resistance well above laminating temperatures so the carrier sheet resists elongation during the laminating step. Following the bonding step, the flexible paint-coated laminate 70 is then passed around one or more chill rollers 82 for cooling the laminate to room temperature. The laminate 70 then passes onto a laminate rewind drum 84. The carrier sheet is stripped away from the laminate prior to the subsequent thermoforming step. This leaves a smooth, defect-free high gloss exterior surface on the clear coat which replicates the high gloss surface present on the carrier sheet.

The thermoformable laminate 70 illustrated in FIG. 7 also can be formed by separate laminating steps, each similar to the laminating step illustrated in FIG. 6. In this embodiment, a separate color coat is first transferred from a casting sheet to the backing sheet. The color coat may have a size coat to bond the color coat to the backing sheet. The casting sheet is stripped away after laminating. The dried clear coat is then transferred from a separate casting sheet to the face of the color coat opposite from the backing sheet. No size coat is necessary to bond the clear coat to the color coat during the hot laminating step.

Thermoforming

In the next step in the process, the laminate 70 shown in FIG. 7 is thermoformed into a desired three-dimensional shape. FIGS. 8 and 9 illustrate one example of a thermoforming step in which the initially flat laminate can be formed into a highly contoured three-dimensional shape for use as the surface of a car body panel. Referring to FIGS. 8 and 9, separate laminate sheets are individually placed inside a clamping frame 106 of a vacuum-forming machine. The clamping frame is movable back and forth on a track 108. The laminate sheet is initially placed in the clamping frame at the position shown in phantom lines at 106 in FIG. 8.

The clamping frame is then moved along the track into an oven 110 for heating the back sheet to a thermoforming temperature. An ABS backing sheet is heated to a temperature in the range of about 280° to about 380° F., and for Bexloy nylon the sheet is heated to a temperature from about 380° to about 420° F. These temperatures are actual sheet temperatures, not oven temperatures. The actual thermoforming temperatures used, within these ranges, may be a factor in preventing deglossing of the clear coat during thermoforming. In some instances described in the examples below, a lower thermoforming temperature can prevent deglossing or formation of small cracks in the surface of the paint coat. These phenomena may otherwise occur at higher thermoforming temperatures. A pressure assist can be used with the thermoforming step in order to reduce the thermoforming temperature. A lower thermoforming temperature of about 270° F. may assist in producing higher gloss and distinctiveness-of-image in the finished surface. At thermoforming temperatures the laminate 70 sags as shown at phantom lines at the right side of FIG. 8.

After the laminate is heated in the oven 110 to the desired temperature, the clamping frame is moved back along the track, away from the oven 110 to its original position above a vacuum-forming buck 112. The working surface of the vacuum-forming buck 112 is shown in FIGS. 8 and 9 as a curved surface, by way of example only. Other configurations can be used depending upon the desired three-dimensional shape imparted to the surface of the finished article.

The preheated laminate is next vacuum-formed into the desired three-dimensional shape by first drawing a vacuum on the vacuum-forming buck 112 through its connection 114 to a vacuum pump. The vacuum-forming buck 112 is then raised to the position shown in FIG. 9, where it has risen into the clamping frame. The vacuum is pulled through holes in the buck to force the molten plastic into the shape of the working surface of the buck. Positive air pressure can be applied to the free face of the clear coat on the opposite side of the back to increase forming pressure. The buck stays in place long enough to cool the plastic to a solid state again before the buck drops away back to the position shown in FIG. 8. This leaves behind the plastic in the shape of the buck. The preferred vacuum-forming step is to use a male vacuum former in which the vacuum-forming buck 112 is in direct contact with the backing sheet so as to not contact the exterior clear coat 45 on the opposite side of the backing sheet. In this way, the backing sheet hides most of any of the possible defects in the working surface of the buck; and the surface of the clear coat is not affected, but is allowed to elongate freely.

In an alternate thermoforming step (not shown), the laminate 70 can be fed to the thermoformer as a continuous sheet. The laminate first passes through the oven and then passes to the thermoforming buck in line with the downstream end of the oven. The continuous sheet is stopped at preset intervals for heating the laminate to the thermoforming temperature while a previously heated portion of the sheet is vacuum formed into the desired shape.

The thermoforming step produces a three-dimensionally shaped preformed laminate 116 illustrated in FIGS. 10 and 11. For simplicity, the preformed laminate is illustrated as comprising the backing sheet 72 and the composite paint coat 44 adhered to it. The laminate is illustrated in a three-dimensionally shaped form following the thermoforming step as one example only of a possible three-dimensional shape. Other complex three-dimensional shapes are also possible. The composite paint coat resists elongation greater than about 40% during thermoforming without deglossing, cracking, stress-whitening, or otherwise appreciably disrupting the exterior automotive durability and appearance properties that were present in the composite paint coat before thermoforming.

Bonding of Thermoformed Laminate to Substrate Panel

FIGS. 10 and 11 schematically illustrate steps in a subsequent injection-cladding operation in which the preformed laminate 116 is adhered to an underlying plastic substrate panel. The injection-cladding step is an example of a possible means for adhering the laminate to the substrate. Following the thermoforming step, the laminate is placed in an injection mold 117 and fused to the face of an injection-molded substrate 118. FIG. 10 illustrates a first step in the injection-cladding step in which a plastic injection mold is in its open position, and the preformed laminate 116 is placed in the mold cavity between front and rear mold halves 120 and 122. The inside surface 124 of the mold half 120 identically matches the exterior contour of the paint-coated surface of the preformed laminate. This surface 124 of the mold is a rigid, high gloss, highly-polished surface which is free of surface defects so that surface defects are not transferred to the high gloss, clear-coated surface of the laminate. After the laminate is preformed to its desired shape, it is trimmed to size and is ready for injection-cladding. The vacuum-formed die cut sheet is placed inside the injection mold and the mold halves 120 and 122 are closed, leaving a space of the desired size behind the laminate for receiving the injection molding material. As shown best in FIG. 11, the injection molding material 118 flows through a passage 126 in the rear mold half 122 and into the mold cavity behind the preformed laminate 116. The molding material conforms to the shape of the mold cavity and is permanently fused to the backing sheet portion of the laminate. The injection molding material does not come into contact with the paint coat. As described previously, the molding materials from which the substrate 118 and the backing sheet 72 are made are compatible so that the two materials fuse to form an integral molded substrate on which the paint coat provides a defect-free finish. The temperature at which the injection-mold is operated is substantially below the melt temperature of the molding material. In one embodiment, in which an ABS backing sheet is used, the molten material is at a temperature of about 450° F., for example. A water jacket can be used to cool the faces of the mold. During injection-molding, the backing sheet material softens when fusing to the injection molding material, and the surface of the clear coat replicates the surface of the mold, owing to the pressure from the molding operation. Both faces of the mold are cooled to a temperature in the range of about 160° to 170° F., so that the paint coat 44 on the laminate remains stable during injection molding. The clear coat material at the time of injection molding has had all of its solvent gas removed so that evolution of gases during injection molding is essentially avoided. As a result, the clear coat retains its high gloss surface characteristics during the injection molding step.

FIG. 12 schematically illustrates the finished article 130 produced by the process of this invention. In the finished article, the preformed laminate and its backing sheet have been fused to the molded substrate 118. In one embodiment, the article can be an exterior car body member or panel. The exterior clear coat 45 and the color coat 46 combine to produce a paint coat with exterior automotive properties on the surface of the substrate. Any defects in the substrate material have been absorbed by the 20 mil thick backing sheet 72 to provide a defect-free paint coat.

Alternatively, the color coat may in some instances be eliminated or the pigmentation reduced, and the coloration may be provided by pigments contained in the backing sheet or molding material for the substrate. In these instances, the clear coat is used with the backing sheet which is thermoformed and then adhered to the substrate according to the processing techniques described previously. As one advantage, coloration contained in the backing sheet can hide the effects of chipping of the paint coat.

Although the invention has been described with respect to the injection-molding steps illustrated in FIGS. 10 and 11, other techniques can be used for forming the finished article illustrated in FIG. 12. These include, but are not limited to, use of sheet molding compound (SMC), compression cladding and reaction injection molding (RIM) techniques, and pressure-sensitive or adhesive bonding techniques. Other plastic molding materials also can be used in place of ABS for fusing the substrate panel to the paint-coated backing sheet. These may include thermoplastic polyolefins (TPO's) such as polypropylenes and polyethylenes; polyesters; and amorphous nylon. In these instances, the backing sheet is preferably made from the same polymeric material as the injection molding material.

Characteristics of Finished Paint Coat

The following is a list of physical properties which are used herein to measure whether the finished paint coat is useful as an exterior automotive paint coat:

(1) Gloss
(2) Distinctiveness-of-Image
(3) Color Uniformity (hiding ability)
(4) Dry Film Thickness Uniformity
(5) Gasoline Resistance
(6) Solvent Resistance
(7) Acid Spotting Resistance
(8) Hardness
(9) Abrasion Resistance
(10) Impact Strength
(11) Adhesion of Paint Coat
(12) Accelerated UV Resistance
(13) Resistance to Water and Humidity Exposure Properties (1) through (4) are considered appearance properties and properties (5) through (13) are considered durability properties. Specifications and test methods for each of these physical properties are described below. Certain specifications and test methods identified below are defined by publicly available standard industry specifications and test methods which are incorporated herein by this reference.

(1) Gloss is measured by specular reflectance of a beam of light at angles of 20° and 60°. The desired specular reflectance for an exterior automotive paint coat surface is at least about 60 to 65 gloss units at 20°, and at least about 75 to 80 gloss units at 60°. Specular reflectance and other criteria herein are measured before the finished painted surface is buffed and waxed. A preferred test method is described in GM Test Specification TM-204-A. The Byk-Mallinckrodt "multigloss" or "single gloss" gloss meters can be used for measuring specular gloss of the finished surface. These gloss meters give values equivalent to those obtained from ASTM Method D-523-67. Either gloss meter is used with gloss standards covering the expected range of measurement, together with a piece of polished black glass plate of known refractive index. The gloss meter is calibrated by setting it to read the gloss of a highly polished standard and then reading the gloss of a working standard having a value preferably in the range of the test panel. The second standard should agree within one unit of its assigned value. At least two readings are taken on a different area of the test panel. These values are averaged if they agree within one unit. If the range is larger than one unit, additional regions are taken and a mean value is calculated.

(2) Distinctiveness-of-Image (DOI) is a measurement of the clarity of an image reflected by the finished surface. DOI can be measured from the angle of reflection of a light beam from a spherical surface. The desired DOI for an exterior automotive paint coat surface is at least about 60 units, where 100 units is the maximum DOI reading. DOI is measured by the Hunterlab Model No. D47R-6F Dorigon Gloss Meter. A test panel is placed on the instrument sensor and the sharpness of the reflected image is measured. Details of the DOI test procedure are described in GM Test Specification TM-204-M, which are incorporated herein by reference.

(3) Color Uniformity is a test to determine whether coloration of the paint coat remains uniform after thermoforming and injection-cladding. Coloration is tested after the paint coat is coated on the casting sheet, before transfer to the backing sheet. Coloration testing is repeated after a deep draw stretch simulating elongation during thermoforming, to determine whether the color has changed. A desirable coloration uniformity can be a color change of no greater than about one to two McAdam units on a calorimeter.

(4) Dry Film Thickness (DFT) is a standard industry measurement of the film thickness of the finished paint coat, to determine whether the paint coat thickness matches a required film thickness specified by the auto manufacturer. For the present exterior automotive specifications, uniformity of the finished paint coat is determined to be a more useful parameter in determining whether the paint coat meets appearance requirements. Thickness uniformity of the finished paint coat can be measured from several locations on the finished article, including highly contoured areas, to determine whether variations in the thickness of the finished paint coat exceed a desired level.

(5) Gasoline Resistance requires no color change, degradation, tackiness, marring or loss of paint adhesion on plastic parts used on and adjacent to fuel filler openings after being immersed for ten seconds, ten times, in a specified reference fuel with a 20 second dry off period between each immersion. Immediately after the tenth immersion, the painted surface is checked and must pass Thumbnail Hardness according to GM Test Specification TM 55-6, incorporated herein by reference.

(6) Cleanability is tested according to GM Test Specification TM 31-11 which is incorporated herein by reference. According to this test, the painted plastic part is required to withstand ten rubs with cheesecloth saturated with 9981062 Naphtha or currently used and approved cleaning solvents, with no evidence of staining, discoloration, or softening of the painted surface. This test requires no evidence of color transfer from the test part to the cloth. One rub consists of one forward and backward motion.

(7) Acid Spotting Resistance requires the test part to withstand exposure to 0.1 N sulfuric acid for 16 hours without any evidence of staining, discoloration, or softening of the painted surface.

(8) Hardness is measured by a standard Knoop Hardness Test. The required hardness is at least a Knoop hardness number of four.

(9) Abrasion Resistance is tested by a gravelometer under the standard test method identified as SAE J-400. According to this test, the painted part shall withstand the Gravelometer Test at minus 10° F. with a minimum rating of eight (F.B. Gravelometer Rating Chart). The tested part should withstand the Gravelometer Test as-received and after Florida exposure described below. A Fisher Body Material Specification FBMS 26-7 (incorporated herein by reference) also defines a minimum level of wear resistance for the finished paint coat.

(10) Impact Strength is tested at room temperature by the Gardener Test and by the Rosand Test at minus 20° F. The paint coat should withstand at least 20 inch-pounds of direct impact with no failure.

(11) Paint Adhesion is tested by a standard Tape Adhesion Test described in GM Test Specification TM 55-3, which is incorporated herein by reference. According to this test, a tape is pressed down over an X-shaped cut in the paint coat and the tape is then removed to test the amount of peeling. The Adhesion Test requires a minimum of 99% of the paint remaining in the tape test area.

(12) Accelerated UV Resistance, also referred to as Accelerated Weathering, or QUV, measures the weatherability of a paint coat in accelerated test procedures designed to provide an accurate indication of long-term UV resistance or other weatherability properties. According to a QUV test useful for measuring accelerated UV Resistance, the test panel should not show any significant surface deterioration or embrittlement loss of coating adhesion, objectionable shrinkage, or noticeable color or gloss change after about 500 to 1,000 hours exposure to UV light and condensation apparatus per ASTM G-53 using eight hour UV cycle at 70° C. and four hour humidity cycle at 50° C.

(13) Resistance to Water and Humidity Exposure is measured by several tests. According to a first test, the finished part shall withstand 96 hours of humidity exposure at 100% relative humidity and 100° F. in a humidity cabinet defined in GM test specification TM 55-3, and a two-hour water immersion test at 100° F. according to GM test specification TM 55-12. These test specifications are incorporated herein by reference. The resulting test panel should show no evidence of blistering when examined one minute after removal from the test cabinet and shall withstand the Paint Adhesion Test described above. The Paint Adhesion Test is performed within one minute after removal from either test cabinet. In a second test, the finished part should withstand 15 cycles of the Moisture-Cold Cycle Test defined in GM test specification TM 45-61A (incorporated herein by reference), without any visible signs of cracking or blistering. After 15 cycles, the part shall withstand 96 hours of the humidity exposure described above, followed by passing the Paint Adhesion Test also described above. The Paint Adhesion Test is performed within one minute after removal from the humidity environment. One cycle consists of 24 hours and 100% relative humidity at 100° F., 20 hours at minus 10° F., and four hours at room temperature.

Other durability tests can be used to determine the usefulness of a paint coat for exterior automotive applications. These tests can include long-term ultraviolet radiation exposure and heat exposure tests. Both of these tests require long-term exposure of the panel to the particular environment. For instance, one long-term UV test can require two years exposure to determine the long-term resistance of the paint coat to ultraviolet radiation. In a long-term weathering and heat resistance test, the painted plastic part is required to withstand two years direct Florida and Arizona test site exposure without any significant color or gloss change, loss of adhesion, or other detrimental surface or substrate deterioration effects. After long-term Florida and/or Arizona exposure, painted samples must withstand testing under the Tape Adhesion, Abrasion, Gravelometer and Moisture-Cold Crack Cycling tests. Five years Florida and Arizona test site exposure also can be used. Other test methods can include sulfide staining, detergent resistance, solvent resistance compatibility, cycle tests, humidity and adhesion, humidity and wear resistance, cold exposure, and Florida and Arizona exposure tests set forth in FBMS 26-7.

EXAMPLE 1

A high gloss jet black laminated exterior automotive paint coat was formed on the exterior surface of an experimental plastic rear window molding for a Pontiac Grand AM. The window molding was similar to that shown in FIG. 2. The paint coat was first coated onto a surface of a flexible polyester film casting sheet. The flexible carrier comprised two mil thick high gloss American Hoechst 3000 polyester film. The paint coat comprised a clear coat, a color coat, and a size coat coated onto the polyester film casting sheet in that order. A thin film of wax was first coated on the polyester film. The wax coating formulation comprised, on a weight basis, 40% xylene, 59.4% cyclohexanone, and 0.6% carnauba wax. The wax was dissolved in the solvents at 120° F. and cast on the polyester film using a gravure coating cylinder. The wax coating was applied as a thin film approximately 0.001 mil thick. The wax-coated casting sheet was then passed through a drying oven and dried at 250° F. with a line speed of 25 feet per minute. The wax-coated casting sheet could be separately run at a higher lineal speed, if desired. The wax film did not affect replication of the polyester film surface by the clear coat.

The clear coat was then prepared from the following formulation:

| Ingredient | Parts |
| --- | --- |
| BLO (Butyrolactone) | 15.00 |
| DIBK (di-isobutyl ketone) | 27.00 |
| Polymethyl methacrylate (Elvacite 2010) | 18.00 |
| PVDF (Kynar 301F) | 18.00 |
| BLO | 6.28 |
| Cyclohexanone | 15.00 |
| Silicone fluid (Dow Corning DC-11) | 0.72 |

The Elvacite 2010 acrylic resin was mixed with the BLO and DIBK solvents under heat applied at approximately 130° F. to dissolve the acrylic resin in the solvents. The resulting mixture was then allowed to cool over night. The PVDF, together with the remainder of the BLO and cyclohexanone solvents and the silicone fluid, were then mixed at room temperatures so that the PVDF component remained as a dispersion in the mixture, rather than dissolving. The dried clear coat contained approximately 50% PVDF and 50% polymethyl methacrylate, by weight, based on the total PVDF-acrylic solids.

The clear coat was coated on the casting sheet in a dry film thickness of about 0.8 mil. The clear coat was applied to the sheet by a reverse roll coater (illustrated in FIG. 5) in line with the gravure oven previously used for drying the wax film, so that the clear coat was applied directly after drying of the wax. The clear coat was dried on the carrier sheet by passing it through a multi-zone impinging air drying oven having three heating zones spaced apart axially along the length of the carrier, with each drying zone having a progressively higher temperature. The clear-coated carrier was passed through the heating zones at a line speed of 25 feet per minute and each heating zone was 40 feet long. Temperatures of the three heating zones were: Zone 1: 260° F., Zone 2: 330° F., Zone 3: 390° F. Passing the clear coat through the three heating zones removed substantially all solvent gases from the clear coat to produce a dry clear coat of uniform film thickness.

A jet black color coat was next coated on the dried clear coat at a dry film thickness of about 0.8 mil. The color coat formulation was as follows:

| Ingredient | Parts |
| --- | --- |
| Cyclohexanone | 9.27 |
| DIBK | 18.54 |
| BLO | 8.34 |
| Polyethyl methacrylate (Elvacite 2042) | 10.02 |
| Dispersing agent (Solsperse 17,000) | 0.10 |

-continued

| Ingredient | Parts |
| --- | --- |
| PVDF (Kynar 301F) | 24.04 |
| BLO | 14.14 |
| Black Dispersion | 15.00 |

The black dispersion comprised carbon black in a vehicle of Elvacite 2043, available commercially as Gibraltar 438-39110 pigment. The color coat formulation was prepared in a similar manner to the clear coat formulation in that the acrylic resin was first dissolved in the cyclohexanone, DIBK and BLO solvents at a temperature of about 130° F. and was then allowed to cool before the PVDF component was added to the mixture to form a dispersion of the PVDF in the acrylic resin. The pigment was then added to the resulting mixture to produce a jet black color. On a weight basis, the amount of pigment contained in the color coat formulation was about 4% to about 5%. The dried color coat comprised approximately 65% PVDF and approximately 35% acrylic resin, by weight of the total PVDF and acrylic (non-pigment) solids. The acrylic resin component comprised polyethyl methacrylate comprised of approximately 90% Elvacite 2042 and approximately 10% Elvacite 2043. The color coat was coated onto the dried clear coat in liquid form and then passed through the three stage oven described above to dry the color coat.

A size coat was next prepared for use with an ABS backing sheet. The size coat comprised 50 parts methyl methacrylate resin known as Acryloid A-101 (a trademark of Rohm and Haas Co.) dissolved in 50 parts methylethylketone solvent. The size coat was coated onto the dried color coat in a dry film thickness of about 0.1 mil using a single station gravure coating cylinder. The size coat was then dried by passing it through a single stage drying oven at a temperature of about 275° F.

The resulting paint-coated carrier was then passed to a laminating operation similar to that illustrated in FIG. 6, where the paint coat was transferred from the polyester carrier to a 20 mil thick ABS backing sheet. In the laminating operation, the backing sheet and the paint-coated carrier were run at a lineal speed of 15 feet per minute, and the laminating drum was operated at a temperature of 400° F. The size coat was heat-activated and the paint coat was transferred from the carrier to the face of the ABS backing sheet during the laminating operation, in which the hot steel drum applied a force of about 300 pounds per lineal inch. The polyester carrier film was stripped away from the surface of the laminate, leaving the paint coat bonded to the ABS sheet, with the clear coat providing a high gloss surface on the exterior of the ABS backing sheet.

The paint-coated laminate was then thermoformed into a complex three-dimensional shape to form the plastic window molding. The laminate was thermoformed by first heating the flat laminate in an oven to a temperature of about 360° F., to soften the laminate. After the laminate was heated, it was placed over a vacuum-former buck similar to that shown in FIGS. 8 and 9, and a vacuum was drawn against the buck on the ABS side of the laminate to form the heated laminate into the three-dimensional shape of the window molding.

The thermoformed laminate was then trimmed to fit in the mold cavity of a plastic injection molding machine. An ABS plastic molding material, for forming the substrate base of the window molding, was injected into the mold behind the thermoformed laminate to fuse the ABS molding material to the laminate. The mold was operated at normal melt temperature for the ABS resin. This formed a window molding as a integral plastic part with a defect-free, paint coat on the exterior surface of the panel.

The window panel was tested and the tests demonstrated the usefulness of the paint coat as an exterior automotive paint coat. The test results indicated that desirable appearance properties, including gloss, were produced. Gloss measured 62 units at 20° and 79 units at 60°. DOI measured 64. Color uniformity was good. The test results also demonstrated a desirable combination of durability properties. The test panel passed gasoline resistance, acid resistance, abrasion resistance (gravelometer reading of 8), impact resistance (80 in-lb. for Gardner Test), QUV, and 96-hour humidity exposure tests, according to test methods similar to those described above.

EXAMPLE 2

A high gloss red laminated exterior automotive paint coat was formed on the exterior surface of a highly contoured plastic automobile body panel. The laminate was matched to a General Motors Fiero red body color and used to make a prototype injection-clad Fiero rear quarter panel. The paint coat was first coated onto a casting film comprising a two mil thick high gloss American Hoechst 3000 polyester film. A clear coat, color coat, and size coat were coated onto the casting film in that order. The clear coat was prepared from the following formulation:

| Ingredient | Parts |
| --- | --- |
| Cyclohexanone | 15.47 |
| BLO (Butyrolactone) | 7.52 |
| DIBK (di-isobutyl ketone) | 21.66 |
| Polyethyl methacrylate (Elvacite 2042) | 12.95 |
| UV absorbers | 1.1 |
| PVDF (Kynar 301F) | 24.05 |
| BLO | 17.24 |

The Elvacite acrylic resin was dissolved in the BLO, DIBK and cyclohexanone solvents, while mixing and under heat at approximately 130° F. The resulting mixture was allowed to cool overnight. The UV absorbers were then added to the mixture and the PVDF was dispersed in the resin. The remaining BLO solvent was added to dilute the final mixture. The PVDF component remained as a dispersion in the mixture rather than dissolving. The dried clear coat contained approximately 65% PVDF and 35% acrylic resin, based on the total PVDF and acrylic solids.

The clear coat was coated on the casting film in a dry film thickness of 0.6 mil. The wax coat described in Example 1 was omitted in this test. The clear coat was dried on the casting sheet by passing it through the same three-zone drying oven described in Example 1. Line speed and temperatures of the three zones were the same. Passing the clear coat through the drying oven removed substantially all solvent gases from the clear coat and produced a dry clear coat of uniform film thickness.

A red color coat was next coated on the dried clear coat at a film thickness of about 0.8 mil. The color coat formulation was as follows:

| Ingredient | Parts |
| --- | --- |
| Cyclohexanone | 10.61 |
| Polyethyl methacrylate (Elvacite 2042) | 2.99 |
| Dispersing agent (Solsperse 17,000) | 0.10 |
| PVDF (Kynar 301F) | 19.95 |
| BLO | 4.02 |
| Solvent (M-Pyrol) | 8.45 |
| Red Dispersion | 57.9 |

The dispersion comprised several pigments as a powder mixed in a vehicle comprising polyethyl methacrylate resin, Elvacite 2043, 16% solids, and 84% cyclohexanone solvent. The color coat formulation was prepared in a similar manner to the clear coat formulation, in that the acrylic resin was first dissolved in the solvents at a temperature of about 130° F. The dispersing agent and a portion of the red dispersion were added. The mixture was allowed to cool to room temperature and the PVDF component was dispersed using a high speed mixer. The remainder of the red dispersion was then added to the resulting mixture to produce a red color match. The dried color coat comprised approximately 65% PVDF and approximately 35% acrylic resin, by weight of the total PVDF and acrylic (non-pigment) solids. The acrylic resin component comprised polyethyl methacrylate, approximately 80% Elvacite 2043 and approximately 20% Elvacite 2042. The pigment was present in a ratio of three parts pigment to ten parts resin binder, or approximately 23% of the total solids. The color coat was coated onto the dried clear coat in liquid form and then passed through the three-stage oven described above for drying the color coat.

A size coat was next prepared for use with an ABS backing sheet. The size coat comprised 75 parts methyl methacrylate resin, Acryloid A-101, dissolved in 25 parts toluene solvent and mixed until homogeneous. (The Acryloid A-101 comprised 40% PMMA solids in MEK solvent.) The size coat was then coated onto the dried color coat in a film thickness of about 0.1 mil. The size coat was applied by a reverse roll coater similar to that described in FIG. 5 and was then dried in the same three-stage drying oven as the clear coat and the color coat. The resulting paint-coated carrier was transferred to a laminating operation similar to that illustrated in FIG. 6, where the paint coat was transferred from the polyester carrier to a 20 mil thick ABS backing sheet. The carrier film was stripped away from the surface of the laminate, leaving the red paint coat with a high gloss surface on the exterior of the ABS backing sheet.

The laminate was then thermoformed into the complex three-dimensional shape of the rear quarter panel. The laminate was thermoformed by passing it, as a continuous sheet, through an oven for heating the laminate to a temperature of about 290° F. After the continuous sheet was heated to this temperature, it was then moved over a vacuum-former and a vacuum was drawn to form the laminate into the three-dimensional shape of the rear quarter panel. Positive air pressure of 15 psi was applied to the clear-coated free face of the sheet and the vacuum was drawn on the ABS side of the sheet.

The thermoformed laminate was placed in the mold cavity of a plastic injection mold, and an ABS-based plastic molding material for forming the substrate base of the quarter panel was injected into the mold behind the thermoformed laminate, to fuse the molding material to the ABS side of the laminate. This formed the rear quarter panel as an integral plastic part with a defect-free, glossy paint coat on the exterior surface of the panel.

The panel was tested, and the tests demonstrated the usefulness of the paint coat as an exterior automotive paint coat. The test results indicated that desirable appearance properties, including gloss, were produced. Gloss measured 65 units at 20° and 80 units at 60°. DOI measured 65. Color uniformity was good. The test results also demonstrated a desirable combination of durability properties. The test panel passed gasoline resistance, cleanability, acid resistance, hardness (7–8 reading on Knoop hardness scale), abrasion resistance (gravelometer reading of 8), impact resistance (80 in-lb. for Gardner Test), QUV, and 96-hour humidity exposure tests, according to test methods similar to those described above. Florida exposure passed after three months.

EXAMPLE 3

Tests were conducted to determine the relative proportions of the PVDF and acrylic components of the clear coat and the color coat capable of producing a composite paint coat that can be cast as a film, laminated to a backing sheet, thermoformed, and injection-clad to form a finished article with an exterior automotive paint coat surface. In this example, standard spray type automotive acrylic enamel paints manufactured by DuPont were used as a paint coat in the process of this invention. These types of paint systems are commonly used at present as exterior automotive paint. The paint coats were thermoset and they cross-linked at low temperatures on the carrier when dried. These paint coats were then transferred from the carrier to a 20 mil thick ABS backing sheet which was then drawn on a vacuum-former. The paint coat was too brittle to elongate properly; it cracked and shattered at stress points in the laminate when thermoformed.

Similar DuPont urethane-based automotive paints normally used on rubber bumpers also failed in a similar manner when thermoformed. These paint systems were stable at room temperature but they cracked during high temperature vacuum-forming.

EXAMPLE 4

In a test similar to that described in Example 3, a non-thermoset acrylic lacquer paint coat was evaluated. The paint coat comprised a DuPont lucite dispersion lacquer thermoplastic acrylic resin paint system. The paint coat was coated on a casting sheet, dried, and laminated to a 20 mil thick ABS backing sheet. This paint system could be thermoformed, but it was difficult to process. If used as a high-solids (low solvent) paint coat, the lacquer took too long to dry. If stabilizers were added to improve drying, it cracked when thermoformed. It also tended to adhere to the injection mold.

EXAMPLE 5

Other pure thermoplastic acrylic resin paint systems were tested, such as a polymethyl methacrylate and solvent-based paint coat with dispersed pigments. Such pure acrylic paint systems were characterized primarily by their difficulty in processing because of their slow rate of solvent evaporation during drying and a tendency to adhere to the surface of the injection mold. Acrylic paint systems with appreciable amounts of pigment deglossed during thermoforming. Pure thermoplastic acrylic paint systems also tended to lack certain mechanical properties that did not meet exterior automotive criteria, including low abrasion resistance (gravelometer) properties. In addition, these pure acrylic resin formulations did not cast well in film form because of their tendency to adhere too strongly to the casting sheet.

EXAMPLE 6

A pure PVDF (Kynar 301F) paint system was tested in the process of this invention. The PVDF paint system had sufficient elongation to thermoform properly without cracking, but it deglossed excessively during thermoforming.

EXAMPLE 7

A thermoplastic acrylic-vinyl paint system was tested experimentally according to the process of this invention. The paint system also included a dispersed black pigment, about 3% by weight of the total solids. This paint system had been used successfully previously for interior automotive trim parts on dashboard panels and the like. The paint system could be laminated to an ABS backing sheet, but when it was thermoformed, it deglossed excessively. This interior paint system did not produce an exterior automotive paint surface that meets minimal gloss and DOI specifications for exterior automotive use. This paint coat, when used for automotive interior parts, also is not applied with a film thickness necessary to meet durability specifications for an exterior automotive finish. Using the higher level of pigment required for an exterior automotive paint coat produced extreme deglossing during thermoforming. Other mechanical properties necessary for exterior use also were not present.

EXAMPLE 8

A blended thermoplastic PVDF-acrylic paint system was tested experimentally with the process of this invention. This blended paint system comprised a dispersion of 72% PVDF and 28% acrylic resin, by weight of the total PVDF-acrylic solids. This paint system was similar to one used commercially on exterior metal trim parts for automobiles in which the metal was spray painted and then cold-formed to produce the desired trim part. This blended paint system contained a dispersion of black pigment comprising about 3% by weight of the total solids. This paint system was not suitable for exterior automotive use. The paint system could be laminated to an ABS backing sheet, but when thermoformed, it deglossed excessively. In addition to its low gloss, this paint system also did not possess the exterior DOI requirements for an exterior automotive finish.

EXAMPLE 9

A PVDF and acrylic resin clear coat was tested in combination with a pure acrylic-based color coat. Each paint coat was coated on a casting sheet, the coatings were dried and transferred to an ABS backing sheet to form a composite paint coat, and the sheet was thermoformed. In one test, the acrylic resin component in the color coat comprised an outdoor weatherable acrylate known as Korad D, a product of Polymer Extruded Products of Newark, N.J. Other tests were conducted with pure acrylic color coat formulations comprising PMMA and PEMA copolymers. In one test, the color coat comprised a pure Elvacite 2042 polyethyl methacrylate. Visual observation of the thermoformed laminates indicated that 15 good appearance properties, including gloss and DOI, were achieved. One observation was that a PVDF and acrylic clear coat can be used in combination with a color coat not containing the PVDF component, resulting in a less expensive composite paint coat that eliminates the more expensive fluorocarbon component from a portion of the finished paint coat.

EXAMPLE 10

Figure 13:
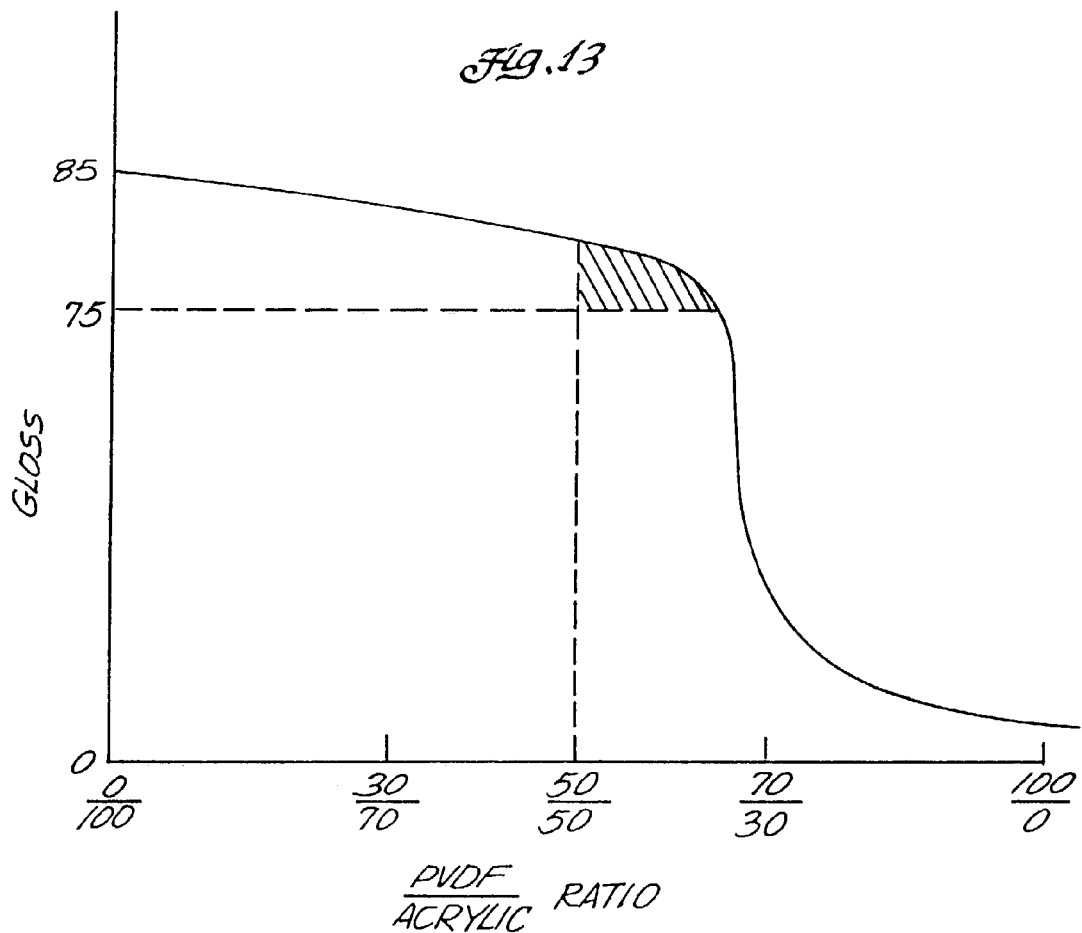
FIG. 13 is a graph illustrating a general relationship between surface gloss and the relative amounts of polyvinylidene fluoride and acrylic resin contained in one embodiment of the paint coat.

Tests were conducted on a composite paint coat comprising an exterior clear coat bonded to a color coat. The solids in the clear coat and the color coat both consisted essentially of a blended thermoplastic PVDF-acrylic paint system. The paint coat was coated on a casting sheet, transferred to an ABS backing sheet, thermoformed, and injection-clad to an ABS substrate. It was determined that certain PVDF/acrylic ratios in the clear coat did not produce a sufficient combination of the appearance and durability properties in the finished laminate suitable for exterior automotive use. For instance, 100% PVDF deglossed during thermoforming, whereas 100% acrylic resin created processing problems, including adherence to the injection mold and slow solvent evaporation. FIG. 13 shows a graph representing a performance curve for the PVDF-acrylic based composite paint coat. This curve represents the relationship between gloss (gloss units at 60°) of the clear coat on the finished article and the ratio of PVDF to acrylic in the dried clear coat, by weight of the total PVDF and acrylic-based solids. This curve is based, upon experimental evaluations of clear coat formulations comprising PVDF and various acrylic resin combinations, primarily combinations of polymethyl methacrylate and polyethyl methacrylate, or mixtures thereof, including a range of low to very high molecular weight acrylic resins. This curve illustrates that a transition point exists between acceptable gloss and unacceptable deglossing above about 65% to 70% PVDF in the clear coat formulation. If the PVDF is contained in a formulation greater than about 70%, excessive deglossing is produced upon thermoforming. The tests used to determine the performance curve also revealed that a 50/50 ratio of PVDF to acrylic is approximately where addition of a greater proportion acrylic resin makes processing of the paint system too difficult. The lined portion of the curve represents a workable combination of PVDF and acrylic resin, for these particular resin combinations, to produce a clear coat having a desirable gloss level. The minimum desired gloss level, for the purpose of this example, was selected as 75 units for 60° specular reflectance. These tests have shown that polymethyl methacrylate in the PVDF and acrylic paint system can produce a generally higher gloss level than polyethyl methacrylate; and therefore, the curve illustrated in FIG. 13 will tend to rise as proportionately more polymethyl methacrylate is used. The curve will become lower as more polyethyl methacrylate is used. Moreover, the tests have shown that addition of pigment to the underlying color coat may cause greater deglossing of the exterior clear coat during thermoforming; and therefore, the curve illustrated in FIG. 13 will tend to become lowered as the pigment level in the color coat increases. Tests have also shown that deglossing of the clear coat may be caused by several factors. For instance, if the clear coat is too thin, the pigment particles from the underlying color coat may migrate through the surface of the clear coat upon thermoforming and cause at least some deglossing. In certain instances, a thicker clear coat can resist this type of deglossing. However, in other instances, a thicker clear coat does not prevent deglossing. In one test, a relatively thick (1.2 mil) clear coat comprising 50% PVDF and 50% polymethyl methacrylate deglossed when thermoformed at 340° F. The underlying color coat contained a substantial pigment level of 23%. By increasing the PVDF in the clear coat to 65% solids and by changing the acrylic component to 35% polyethyl meth-acrylate, and by using a lower thermoforming temperature of 290° F., deglossing of the clear coat was prevented.

EXAMPLE 11

Experiments were conducted to compare the physical properties of exterior automotive PVDF/acrylic coatings prepared as a solution of PVDF in the acrylic resin with similar dispersion systems. The tests were conducted for both the clear coat and the color coat to compare gloss and distinctiveness-of-image (DOI) levels for thermoformed panels made with combinations of both solution and dispersion cast PVDF/acrylic films. Dispersion and solution clear coats and color coats were produced from the following formulations:

Dispersion Clear Coat:

| Ingredient | Parts |
|---|---|
| Polymethyl methacrylate (Elvacite 2010) | 50 |
| PVDF (Kynar 301F) | 50 |
| High boiling point acetate solvent (Exxate 700) | 74 |
| Solvent (M-Pyrol) | 55.5 |
| Cyclohexanone | 55.5 |

Solution Clear Coat:

| Ingredient | Parts |
|---|---|
| Polymethyl methacrylate (Elvacite 2010) | 50 |
| PVDF (Kynar 301F) | 50 |
| Solvent (M-Pyrol) | 225 |
| Methethylketone | 225 |

Dispersion Color Coat:

| Ingredient | Parts |
|---|---|
| DIBK (di-isobutyl ketone) | 18.55 |
| BLO (Buytrolactone) | 8.34 |
| Polyethyl methacrylate (Elvacite 2042) | 10.20 |
| Cyclohexanone | 9.27 |
| Dispersing agent (Solsperse 17,000) | 0.10 |
| PVDF (Kynar 301F) | 24.40 |
| BLO | 14.14 |
| Black dispersion | 15 |

Solution Color Coat:

| Ingredient | Parts |
|---|---|
| Polyethyl methacrylate (Elvacite 2042) | 10.20 |
| Dispersing agent (Solsperse 17,000) | 0.10 |
| PVDF (Kynar 301F) | 24.40 |
| Black dispersion | 15.00 |
| Solvent (M-Pyrol) | 86.00 |
| Methyethylketone | 74.30 |

The dispersion clear coat was prepared by initially dissolving the Elvacite 2010 in the Exxate 700 and the cyclohexanone. The Kynar 301F was then dispersed in the resulting mixture using a high speed mixing blade from a Cowles mixer. The M-Pyrol was then added to the resulting mixture. Mixing was at room temperature so that the PVDF component remained as a dispersion in the mixture rather than dissolving. The dispersion clear coat was then coated on a casting sheet of polyester film by a reverse roll coater. The clear coat was then dried on the carrier sheet by the drying techniques described herein.

The solution clear coat was prepared by dissolving both resins in the solvent blend and by mixing with a high speed Cowles mixer to add sufficient heat to the mixture to completely dissolve, the resin. The solution clear coat had substantially less solids (less than about 20% PVDF/acrylic solids) than the dispersion clear coat along with use of stronger solvents to produce a clear solution PVDF/acrylic coating.

The dispersion color coat was prepared by dissolving the Elvacite 2042 in the DIBK and Cyclohexanone solvents along with the first part of the BLO solvent. The Kynar 301F was dispersed in the resulting mixture which was then diluted with the remaining BLO prior to adding the black dispersion. The black dispersion comprised carbon black dispersed in Elvacite 2042 and cyclohexanone.

The solution color coat was prepared by dissolving both resins in the solvent and then adding the black dispersion. The color coats were cast on separate polyester casting sheets, rather than coating them over a dried clear coat. If the base coat is cast over a dried clear coat, the solvents in the base coat attack the clear coat, especially in a solution-form base coat with its stronger solvents. Both color coats were then dried on their respective casting sheets.

Four thermoformable laminates were then prepared for testing gloss and DOI. Various combinations of dispersion clear coat, dispersion color coat, solution clear coat, and solution color coat PVDF/acrylic laminates, as described, below, were prepared. Each thermoformable laminate comprised a color coat and clear coat laminated to an 18 mil ABS sheet. The color coat was first laminated to the ABS backing sheet, the polyester casting sheet was stripped away, then the clear coat was laminated over the color coat and the polyester ca~ting sheet for the clear coat was then stripped away, leaving an ABS thermoformable laminate with the color coat and exterior clear coat bonded to a face of the backing sheet. The backing sheet was then subjected to deep draw thermoforming using a pressure assist (thermoforming temperatures were approximately 270–280° F.) to produce the test panels which were then measured for gloss and DOI levels.

Comparative tests of gloss and DOI for the dispersion and solution paint coats revealed the following results:

| Laminate | 20° gloss | 60° gloss | DOI |
| --- | --- | --- | --- |
| Dispersion clear coat/ Dispersion color coat | 66 | 82 | 72 |
| Solution clear coat/ Dispersion color coat | 69 | 82 | 82 |
| Dispersion clear coat/ Solution color coat | 65 | 81 | 70 |
| Solution clear coat/ Solution color coat | 70 | 81 | 89 |

These test results demonstrated that higher levels of DOI are achieved by using the solution PVDF/acrylic coatings compared with similar dispersion coatings. Moreover, the DOI levels are high, greater than about 80 units and approaching 90 units in one instance, when the laminate includes at least a clear coat of solution-form PVDF/acrylic resin. 60° gloss levels remained about the same for solution and dispersion coatings, and these gloss levels were sufficiently high to meet exterior automotive requirements. 20° gloss levels were somewhat higher with the solution clear coat films. Best results were obtained when the paint coat comprised both a clear coat and an underlying color coat of the solution PVDF/acrylic resin.

EXAMPLE 12

The chemical resistance properties of the PVDF/acrylic paint coats of this invention were compared with three other commercially used automotive paint systems. The results demonstrated that the paint coat of this invention exhibited the best chemical resistance. Two panels comprising PVDF/ methyl methacrylate clear coats according to this invention were tested for chemical resistance (acid/alkali spotting). Three additional test panels, comprised clear coats and pigmented base coats made from commercially available thermoplastic lacquer automotive paint systems which comprised dispersions of polymethyl methacrylate copolymers. Two additional tests panels comprised a rigid enamel, i.e., a melamine acrylic thermoset exterior automotive paint, and a flexible enamel, i.e., a flexible melamine polyester thermoset exterior automotive paint. Several test solutions were used, including organic acids, G.M. acid rain, and various concentrations of sulfuric acid, hydrochloric acid and sodium hydroxide. The paint coats of this invention achieved the highest rating and were untouched by the different test solutions. Each of the commercial automotive paints experienced etching by one or more of the test solutions.

Thermoplastic Polyolefin Backing Sheet and Substrate

Thermoplastic polyolefins (TPO's) such as polypropylene and polyethylene are useful as a car body substrate material because of their impact resistance, corrosion resistance, and their ability to be formed into different complex configurations. Previously, TPO's have been difficult to paint and this has limited their use in the automotive market. Adhesion of the paint coat to the TPO substrate, particularly, has been a problem. The process of this invention can be used to produce an automotive quality paint coat on a TPO car body panel, and good adhesion can be produced between the paint coat and the TPO composite structure forming the underlying car body panel.

Briefly, in this embodiment of the invention, a thin size layer of a thermoplastic chlorinated polyolefin (CPO) is coated between the paint coat layer on the flexible carrier film and the flexible TPO backing sheet. This composite structure is then thermoformed and bonded to a thick rigid layer of a TPO resin forming the substrate base for the composite car body panel.

The size coat is preferably made from a coating composition of a solution of the CPO. The coating composition contains about 10–60% by weight of the CPO and correspondingly about 40–90% by weight of solvent. Any conventional solvent can be used that will dissolve the CPO such as toluene or xylene. The CPO preferably is a chlorinated polypropylene or chlorinated polyethylene containing up to about 50% by weight chlorine and preferably about 15–50% by weight chlorine. One preferred chlorinated polypropylene is a propylene/maleic anhydride copolymer chlorinated to a level of about 15–50% by weight chlorine. One particularly preferred chlorinated polypropylene comprises polypropylene and maleic acid containing about 18–35% by weight chlorine and having an acid no. of about 15.

The flexible backing sheet and the rigid substrate layer of the composite car body panel are prepared from standard automotive quality TPO resins, typically a polypropylene resin.

The TPO composite of this invention provides automotive manufacturers with many-advantages over prior art compositions. Adhesion problems with recessed portions of a part are minimized, solvent emissions associated with spray painting, the need for expensive hangers and jigs to maintain shape of a plastic part during baking, and the need for a primer which is required in a conventional paint spraying process all are eliminated. Additionally, the composite has a unique set of characteristics that make it superior to conventional injection molded and spray painted parts.

The color coat/clear coat of the composite of this invention can be cured at temperatures in excess of 200° C. versus a maximum of 125° C. for conventional injection molded and spray painted plastic parts. This allows for the use of paint chemistries which cannot be used with conventional TPO parts. For example, the fluorocarbon polymers of this invention can be used and are substantially more durable and chemical resistant than conventional low bake paints.

The TPO used for the flexible backing sheet can be 15 of a different quality than the TPO used for the rigid substrate layer of the composite. Presently, in the formation of injection molded automotive parts from TPO resins, the TPO resin must be of the highest quality, i.e., free of gel particles and any foreign matter, to ensure that a defect free part is formed with an automotive quality surface. Since the surface quality of the composite of this invention is determined by the surface of the flexible backing sheet, only the backing sheet need be of a high quality TPO resin, while the 25 rigid substrate layer of the composite can be of a lower quality TPO resin, for example, that may contain gel particles and not affect the appearance of the resulting part or the structural integrity of the part.

The ability to separate the surface characteristic of the composite from the injection molded resin used to, form the rigid layer of the composite allows for the formation of greatly improved auto parts. For example, fiberglass reinforced or other filler reinforced TPO's can be used for the injection molding resin for the rigid layer of the composite, and stronger and more rigid parts can be formed than has been possible before.

The following example illustrates use of the TPO composite structure in a car body panel.

EXAMPLE 13

A thermoformed thermoplastic polyolefin (TPO) quarter panel for a Pontiac Fiero having an exterior high gloss jet black automotive paint was formed. The paint coat was first coated onto a surface of a sheet of flexible polyester film. The film is a 50 micron thick high gloss duPont Mylar 200A polyester film. The paint layers coated onto the film were a clear coat, a color coat and a chlorinated polyolefin size coat. Each was coated onto the polyester film in that order.

A clear coating composition was prepared as follows:

| Ingredient | Parts |
| --- | --- |
| Methylethyl ketone | 40.85 |
| Butyrolactone | 40.85 |
| Elvacite 2021 —(Polymethyl methacrylate having a weight average Mw of 200,000) | 6.22 |
| UV absorber [Tinuvin 900-2-hydroxy-3,5-di[i,l-dimethyl(benzyl)phenyl]-2H-benzotriazole] | 0.35 |
| Hindered amine light stabilizer-[Tinuvin 292-bis(I,2,2,6,6-pentamethyl-4 piperidinyl)sebacate ] | 0.18 |
| Kynar 301F | 11.15 |

The solid ingredients were added to the methyl ethyl ketone and butyrolactone solvents with mixing and mixing was continued until dissolved. The film forming binder of the coating contained about 65% PVDF and 35% polymethyl methacrylate. The clear coating was applied by reverse roll coater to the polyester film. The clear coat was dried on the polyester film by passing it through a multi-zone impinging air drying oven having three heating zones spaced apart axially along the length of the carrier, with each drying zone having a progressively higher temperature. The clear-coated polyester sheet was passed through the heating zones at a line speed of about 7.5 meters per minute; each heating zone was about 12 meters long. Temperatures of the three heating zones were: Zone I: 125° C.; Zone 2: 165° C.; Zone 4: 200° C. By passing the clear coated polyester sheet through the three heating zones, substantially all solvent gases from the clear coat were removed to produce a dry clear coat of uniform film thickness about 20 microns thick.

A jet black color coating composition was formulated as follows:

| Ingredient | Parts |
| --- | --- |
| Cyclohexanone | 9.27 |
| Diisobutyl ketone | 18.54 |
| Butyrolactoge | 8.34 |
| Elvacite 2042 = (polyethyl methacrylate having a weight average Mw 300,000) | 10.02 |
| Solsperse 17,000 Dispersing agent | 0.10 |
| Kynar 301F | 24.04 |
| Butyrolactone | 14.14 |
| Black Pigment Dispersion | 15.00 |

The black pigment dispersion comprised carbon black in a vehicle of Elvacite 2043 (polyethyl methacrylate) available commercially as Gibraltar 438-39110 pigment.

The color coating composition was prepared by first dissolving the acrylic resin in the cyclohexanone, disobutyl ketone and butyrolactone solvents at a temperature of about 55° C. and then allowing it to cool before the polyvinyl fluoride component was added to the mixture to form a dispersion of the PVDF in the acrylic resin. The black pigment dispersion was then added to the resulting mixture to produce the jet black color coating composition. On a weight basis, the amount of pigment contained in the color coating was about 4–5%. The binder of the coating contained about 65% PVDF and 35% acrylic resin by weight. The acrylic resin component comprised about 90% Elvacite 2042 and 10% Elvacite 2043. The color coating composition was coated onto the dried clear coat as above and then passed through the three stage oven described above to dry the color coating and form a dry color coating layer about 20 microns thick.

A CPO (chlorinated polyolefin) size coating composition for use with a TPO backing sheet was formulated as follows:

| Ingredient | Parts |
| --- | --- |
| Xylene | 24.60 |
| Chlorinated polyolefin (CPO) solution (Eastman's CP-343-1 25% solids in xylene of chlorinated polypropylene/maleic acid polymer, acid no. about 15, chlorine content about 18–23%) | 25.00 |
| Toluene | 42.50 |
| N-methyl pyrrolidone | 1.00 |
| Acrylic Dispersion Resin (60% solids of an acrylic vinyl oxazoline ester polymer described in Example 1 of Miller U.S. Pat. No. 3,844,993) | 6.90 |

The binder of the size coating composition contained about 60% CPO and about 40% acrylic resin by weight. The size coat composition was coated onto the dried color coat to a dry film thickness of about 2.5 microns using the reverse roll coater. The three temperature zones were maintained at the same temperature as used for the clear and color coats but a carrier speed 30 meters per minute was used.

The resulting paint coated polyester film was then passed to a laminating operation illustrated in FIG. 2, where the paint coat of the polyester film was transferred, to a 500 micron thick TPO backing sheet made from RPI E-1000, thermoplastic olefinic elastomer from Republic Plastics Company, to form a face sheet. RPI E-1000 has a flexural modulus of approximately 690 MPa and a melt flow rate of approximately 0.8 g/10 min. In the laminating operation, the backing sheet and the paint coated polyester film carrier were run at a lineal speed of 5 meters per minute, and the laminating drum was operated at a temperature of 177° C. The CPO size coat was heat activated and the paint coat was transferred from the polyester film to the face of the TPO backing sheet during the laminating operation, in which the hot steel drum applied a force of about 54 kg/lineal cm to form the face sheet. The polyester film was stripped away from the surface of the face sheet, leaving the paint coat bonded to the TPO sheet, with the clear coat providing a high gloss surface on the exterior of the TPO backing sheet.

The resulting face sheet was then thermoformed into a complex three-dimension shape to form a plastic quarter panel molding. In the thermoforming process, the face sheet was first heated to a temperature of about 121° C. to soften the face sheet. The heated face sheet then was placed over a pressure assist vacuum former buck and a vacuum was drawn against the buck on the TPO side of the face sheet and 2.1 kg/cm² gauge of air pressure applied on the clear coat side of the laminate to form the heated face sheet into the three dimensional shape of the quarter panel.

The resulting thermoformed laminate was then trimmed to fit in the mold cavity of a plastic injection molding machine. A quarter panel was then formed. An elastomeric thermoplastic alloy molding resin RTA-3263 from Republic Plastics Company, having a flexural modulus of about 1725 MPa was used for forming the base of the quarter panel. The resin was injected into the mold behind the thermoformed laminate, fusing the resin to the TPO base of the laminate to form the quarter panel about 2.5–3.75 mm thick. The mold was operated at the normal melt temperature for the resin. A quarter panel was formed that is in an integral plastic composite part with a defect-free paint coat on the exterior surface of the panel.

The quarter panel was tested and the tests demonstrated the usefulness of the paint coat as an exterior automotive finish. The test results indicated that desirable appearance properties, including gloss, were produced. Specular reflectance measured units 70 units at 20° gloss and DOI measured 85 units. Color uniformity was good. The test results also demonstrated a desirable combination of durability properties. The test panel passed tests for gasoline resistance, acid resistance, chip resistance (gravelometer reading of 9), impact resistance (80 in./lb, for Gardner Test), and passed QUV and 96 hour humidity exposure tests.

Water Soluble Protective Coatings

As disclosed previously, a thin film of wax can be coated onto the flexible carrier sheet prior to casting the clear coat onto the carrier. The wax film can serve as a protective layer for the finished painted car body panel.

In addition, a separate water soluble protective coating can be applied to the clear coat (or to the wax film on the clear coat) during processing so that the water soluble layer is available to provide a protective mar resistant exterior coating for the finished car body panel, through assembly of the automobile and shipment to the purchaser. The coating is preferably a low molecular weight material which adheres to the clear coat throughout processing and can be buffed to a glossy finish.

Preferably, the water soluble protective coating is overstamped as a barrier film onto the dried clear coat. The clear coat and color coat are cast on a polyester carrier film and bonded to the flexible backing sheet as described previously. Separately, a water soluble coating such as polyvinyl alcohol (PVA) is coated onto a flexible polyester carrier sheet and dried. After the carrier film is stripped away from the surface of the clear coat, the PVA film is overstamped onto the surface of the clear coat, preferably by pressure roll techniques. The PVA is separately cast so that it is not subjected to solvent attack from the clear coat and so that it would not interfere with the transfer of gloss to the surface of the clear coat from the polyester casting film. The polyester carrier film is then stripped away from the PVA layer, leaving a water soluble protective film of PVA bonded to the exterior surface of the clear coat. The resulting backing sheet is then subjected to further processing, including thermoforming and injection-cladding, leaving a finished car body panel with the water soluble protective outer coating. This coating can then be easily buffed or removed with water by the auto dealer or purchaser.

Controlled Flop/Head-On Brightness

The color coats used in this process can include metallic flake pigments. When a metallic flake pigment dries on a substrate surface, the flakes generally become oriented in parallel to the surface of the substrate. These orientations can vary, however, especially with spray painting, which can cause substantial disorientation and resulting differences in the apparent color of the finished paint. Visual color comparisons of metallic paints can be made by known procedures for measuring such parameters as flop index and head-on brightness (HOB). (These measurements are described in U.S. Pat. No. 4,692,481 to Kelly, which is incorporated herein by this reference.) A finished paint coat with well-oriented metallic flakes has desirable high flop and HOB values. The process of this invention can be used to produce a finished metallic flake paint coat with high flop and HOB values. The metallic flake color coat can be coated separately onto its polyester carrier film and slowly dried on the film to carefully align the metallic flakes in a parallel orientation, achieving high flop and HOB values. The pre-aligned metallic flake pigment is then subjected to further processing (transfer to the backing sheet, thermoforming, and injection-cladding, for example) to produce a finished car body panel with the high flop and HOB values. The linear orientation of the flakes is not disrupted during further processing and is thought to be enhanced by the elongation occurring during thermoforming. The high values for flop and HOB are substantially higher than with spray painting a similar substrate.

In addition, even higher HOB values are produced when the paint coat of this invention uses metallic flakes with a thickness of less than about 2000 Angstroms. An example of these flakes is available from Avery Decorative Film Division of Avery International. These metallic flakes are sold as L-53520 and identified as Bright Aluminum Flake. The paint coat of this invention, when using these metallic flakes, can achieve an HOB value of greater than 140 units, for a pure silver color coat.

Pigmented Backing Sheet

Improvements can be provided by using a pigmented backing sheet in the process of this invention. Experiments have shown that light transmission through a paint-coated laminate is reduced when a pigmented backing sheet is used in the process, as compared with a clear backing sheet. These experiments included measuring light transmission through a white paint coat laminated to a black backing sheet (the paint coat comprised a clear coat and underlying white color coat), compared with measuring light transmission through the same white paint coat laminated to a clear backing sheet. The pigmented backing sheet increases opacity substantially, thereby reducing the amount of pigment required in the color coat to hide defects in the underlying substrate.

Pre-Applied Graphics

Printed graphics can be incorporated into the process of this invention. In one process for applying graphics to the finished paint coat, the clear coat is first cast onto the flexible polyester carrier film. The clear coat is then dried on its carrier film. The graphics pattern is then printed on the surface of the dried clear coat opposite from the carrier film. The graphics pattern can be any desired pinstriping pattern, for example. The color coat also is cast on the clear coat and over the graphics pattern and dried. This leaves the clear coat on its carrier film with the pre-applied graphics and color coat visible through the clear coat. Alternatively, the color coat can be cast in a separate carrier film and then transferred in dry film form over the pre-printed graphics pattern and onto the dried clear coat. A suitable size coat is then applied to the surface of the dried color coat, and the resulting laminate is transferred to the flexible backing sheet by the techniques described previously. The carrier film is stripped away in this process, and the resulting paint-coated laminate is thermoformed into the desired shape to form a mold insert. The resulting mold insert is then injection clad with the desired substrate material to form the finished car body panel. An advantage of this process is that graphics patterns are printed under an automotive quality clear coat, which provides a smooth exterior surface on the finished car body panel protecting the underlying graphics. The graphics are therefore not subject to wax or dirt buildup around them as is the case presently with graphics applied to the surface of a finished exterior paint coat.

Thus, the present invention provides a dry paint process and paint system which produce a useful blend of durability, chemical and visual appearance properties. The paint coat has a combination of durability, gloss, resistance to deglossing, and elongation that produce and retain exterior automotive properties in the paint coat throughout the processing steps. As one advantage, the invention makes it possible to use high molecular weight PVDF in an OEM exterior paint for plastic car bodies, despite the temperature limitations of molded plastic materials and the fact that PVDF normally requires use of strong solvents and high temperatures to form glossy films from this polymer. By alloying PVDF polymers with acrylic polymers, the result is a paint coat with superior mechanical properties, including exterior durability, chemical resistance and toughness. The low surface energy surfaces characteristic of fluoropolymers also provide enhanced washability and produce a high contact angle "beading" surface requiring little or no waxing. As a further advantage, the dry paint process allows part production and coating to be coincidental with the other manufacturing operations at an automobile production plant by transferring quality control, solvent emission problems and color control to an outside supplier. This can eliminate from the auto plant the conventional coating operations, including application lines and ovens.

Figure 14:
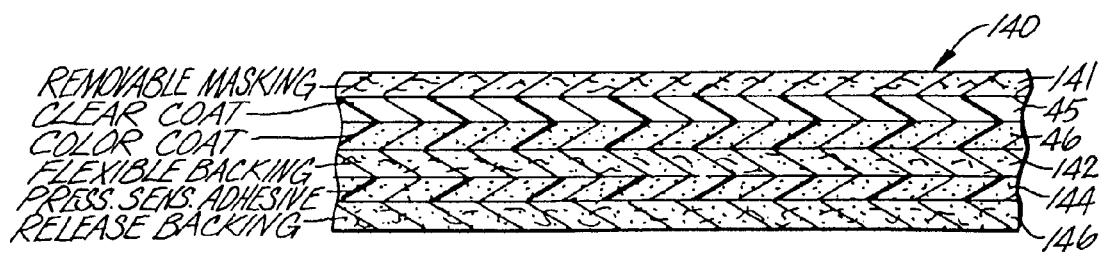
FIG. 14 is a schematic cross-sectional view illustrating one embodiment of a laminate having a dry paint film and a pressure-sensitive adhesive backing for use in automotive paint coat repair, according to principles of this invention.

As a further advantage, the dry paint process can be extended to producing a flexible self-adhesive laminate for use in automotive refinishing. FIG. 14 illustrates one embodiment of such a laminate 140 which can allow rapid refinishing of an exterior automotive paint coat with greatly reduced surface preparation requirements. The flexible laminate comprises a removable masking 141, the clear coat 45 bonded to the color coat 46 (although a single paint coat having exterior automotive properties can be used as an alternative to the separate clear coat and color coat), a flexible backing 142 adhered to the color coat 46, a pressure-sensitive adhesive 144 on the flexible backing, and a release backing 146 covering the pressure-sensitive adhesive. This laminate can be tolerant to rough surfaces and develop good adhesion because of the conformability provided by its flexibility and the pressure-sensitive adhesive backing. By applying a trimmable self-adhesive sheet for large and small areas, it can have application to skilled refinisher as well as use for the consumer market by eliminating the need for large paint booths and ovens, capital investment, and environmental emission problems normally associated with exterior automotive refinishing.

Although the invention has been described as relating to automotive quality paint coats applied to car body panels, it is to be understood that the invention is not limited solely to automotive uses or exterior automotive panels. The invention is also applicable to other vehicles requiring automotive-quality exterior paint coats. Trucks, motorcycles, boats, dune buggies, and the like are examples. Moreover, the invention is applicable to a variety of exterior body members or parts of motor vehicles. Bumpers, fender extensions, wheel covers, hub caps, trim rings for wheels, lamp housings, grills and other exterior facia components or parts are examples of other substrates to which the paint coat can be applied, in addition to conventional exterior body parts or panels of the vehicle.

What is claimed is:

1. A dry paint transfer process for making a deep draw molded plastic vehicular body panel having an exterior automotive quality paint coat on a contoured outer surface of the body panel, in which the paint coat on the body panel has a glossy clear coat/color coat paint finish with a distinctness-of-image value of at least about 60, which comprises:

(a) coating an optically clear weatherable and hardenable thermoplastic and thermoformable polymeric clear coat material onto a smooth high gloss surface of a carrier comprising a flexible high temperature-resistant polymeric casting sheet;

(b) hardening the clear coat polymeric material to form a thermoplastic and thermoformable optically clear film having a first, exposed face and a second face contiguous with the smooth surface of the carrier;

(c) applying to the first, exposed face of the clear film a pigmented color coat comprising a thermoplastic and thermoformable polymeric material with pigments distributed therein, and hardening the color coat to form a clear coat/color coat paint film supported by the carrier;

(d) transferring the clear coat/color coat paint film from the carrier by the steps of adhering a preformed continuous and self-supporting thermoformable resinous backing sheet to the color coat side of the clear coat/color coat paint film and separating the carrier from the composite of the resinous backing sheet and the clear coat/color coat paint film to expose the second face of the clear coat as a glossy, smooth outer surface transferred from the surface of the carrier, the composite of the backing sheet and the clear coat/color coat paint film being thermoformable and having an unextended state and an elongated state in which the paint film is sufficiently pliable under the application of heat and pressure during thermoforming to stretch the clear coat/color coat paint film when conforming the film to a contoured shape; and (e) thermoforming the composite of the backing sheet and the clear coat/color coat paint film to form a deep draw three-dimensionally shaped, paint-coated laminate which retains its contoured shape upon thermoforming and in which regions of the clear coat/color coat paint film are subjected to elongation greater than about 50% of its unextended state while the elongated paint film retains said glossy, smooth outer surface, said laminate having an instrument-measured distinctness-of-image value of 60 or greater following said thermoforming, the paint film on said laminate providing the outer component of a vehicular body part having a deep draw contoured outer surface with a clear coat/color coat paint film of exterior automotive quality, in which the backing sheet comprises a polyolefin polymer and is bonded to the clear coat/color paint film by a chlorinated polyolefin adhesive.

2. A dry paint transfer process for making a deep draw molded plastic vehicular body panel having an exterior automotive quality paint coat on a contoured outer surface of the body panel, in which the paint coat on the contoured body panel has a glossy clear coat/color coat paint finish with a distinctness-of-image of at least about 60, which comprises:

(a) coating an optically clear weatherable and hardenable thermoplastic and thermoformable polymeric clear coat material onto a smooth surface of a carrier comprising a flexible high temperature resistant polymeric casting sheet;

(b) hardening the clear coat polymeric material to form a thermoplastic and thermoformable optically clear film having a first, exposed face and a second face contiguous with the smooth surface of the carrier;

(c) applying to the first, exposed face of the clear film a pigmented color coat comprising a thermoplastic and thermoformable polymeric material with pigments distributed therein, and hardening the color coat to form on the carrier a clear coat/color coat paint film supported by the carrier;

(d) transferring the clear coat/color coat paint film from the carrier by the steps of adhering a preformed continuous and self-supporting thermoformable resinous backing sheet to the color coat and separating the carrier from the composite of the backing sheet and the clear coat/color coat paint film to expose the second face of the clear coat as a glossy, smooth outer surface transferred from the surface of the carrier, the composite of the backing sheet and the clear coat/color coat paint film being thermoformable and having an unextended state and an elongated state in which the paint film is sufficiently pliable under the application of heat and pressure to stretch the clear coat/color coat paint film to conform the film to a contoured shape;

(e) thermoforming the composite of the backing sheet and the clear coat/color coat paint film to form a deep draw three-dimensionally shaped paint-coated laminate which retains its contoured shape upon thermoforming and in which regions of the clear coat/color coat paint film on said finished vehicular body panel are subjected to elongation greater than about 50% of its unextended state while the paint-coated laminate retains said glossy, smooth outer surface; and (g) molding a resinous substrate material to the backing sheet to form a contoured finished vehicle body panel in which the paint-coated laminate forms a decorative clear coat/color coat paint finish on the outer surface of the finished body panel with the pigmented color coat layer visible through the outer clear coat, the backing sheet having sufficient thickness to absorb defects present in the resinous substrate material to produce an essentially defect-free outer surface on the finished body panel, the clear coat/color coat paint film providing a glossy, weatherable, defect-free exterior automotive quality paint coat with an instrument-measured distinctness-of-image value of 60 or greater on the outer surface of the finished body panel; in which the backing sheet comprises a polyolefin polymer and is bonded to the clear coat/color paint film by a chlorinated polyolefin adhesive, and in which the substrate material comprises a polyolefin polymer.

* * * * *